United States Patent
Harigovindan et al.

(10) Patent No.: US 11,927,271 B2
(45) Date of Patent: Mar. 12, 2024

(54) SIMPLIFIED SHUTTLE VALVE DESIGN WITH SPOOL-SLEEVE ASSEMBLY

(71) Applicant: The Boeing Company, Chicago, IL (US)

(72) Inventors: Vasudevan Harigovindan, Bangalore (IN); Thulasi Krishna Rao B., Bangalore (IN)

(73) Assignee: The Boeing Company, Chicago, IL (US)

( * ) Notice: Subject to any disclaimer, the term of this patent is extended or adjusted under 35 U.S.C. 154(b) by 427 days.

(21) Appl. No.: 17/396,429

(22) Filed: Aug. 6, 2021

(65) Prior Publication Data

US 2022/0252165 A1 Aug. 11, 2022

Related U.S. Application Data

(60) Provisional application No. 63/147,589, filed on Feb. 9, 2021.

(51) Int. Cl.
*F16K 11/07* (2006.01)
*B60T 15/02* (2006.01)
*B64C 25/44* (2006.01)
*F16K 27/04* (2006.01)

(52) U.S. Cl.
CPC .......... *F16K 11/0712* (2013.01); *B60T 15/02* (2013.01); *B64C 25/44* (2013.01); *F16K 27/041* (2013.01)

(58) Field of Classification Search
CPC .... F16K 11/0712; F16K 27/041; B60T 15/02; B60T 15/00; B64C 25/44
See application file for complete search history.

(56) References Cited

U.S. PATENT DOCUMENTS

| | | | | |
|---|---|---|---|---|
| 2,985,147 A | * | 5/1961 | Rockwell | F15B 13/06 137/625.68 |
| 3,247,768 A | * | 4/1966 | Tennis | F16K 11/0704 91/189 R |
| 3,866,880 A | * | 2/1975 | Schexnayder | F16K 11/0704 251/297 |
| 4,260,132 A | * | 4/1981 | Habiger | F16K 11/0704 251/297 |
| 4,913,190 A | * | 4/1990 | Kugler | F16K 11/0704 251/297 |
| 7,845,370 B2 | * | 12/2010 | Cook | F16K 11/07 137/625.65 |

(Continued)

*Primary Examiner* — Patrick C Williams
(74) *Attorney, Agent, or Firm* — FERGUSON BRASWELL FRASER KUBASTA PC

(57) ABSTRACT

A spool-sleeve assembly includes a sleeve having a first inner radius. Flanges are integrally formed with the sleeve. The flanges extend outwardly. The flanges have flange segments via slits, disposed in the flanges. Press fittings extend inwardly from an inner wall of the sleeve proximate the ends and the slits. The sleeve has a second inner radius, smaller than the first inner radius, at the press fittings. A hole is provided through the sleeve between the flanges. The spool-sleeve assembly also includes a spool, slidably disposed inside the sleeve. Ridges outwardly extend from the spool at the ends of the spool. The ridges have outer diameters that are greater than the second inner radius. Grooves are provided in the ridges. The press fittings fit in the grooves.

20 Claims, 15 Drawing Sheets

(56) References Cited

U.S. PATENT DOCUMENTS

2007/0023722 A1* 2/2007 Oishi ................. F16K 31/0613
137/625.69
2009/0014076 A1* 1/2009 Hirano ................. F16K 31/426
137/625.6

* cited by examiner

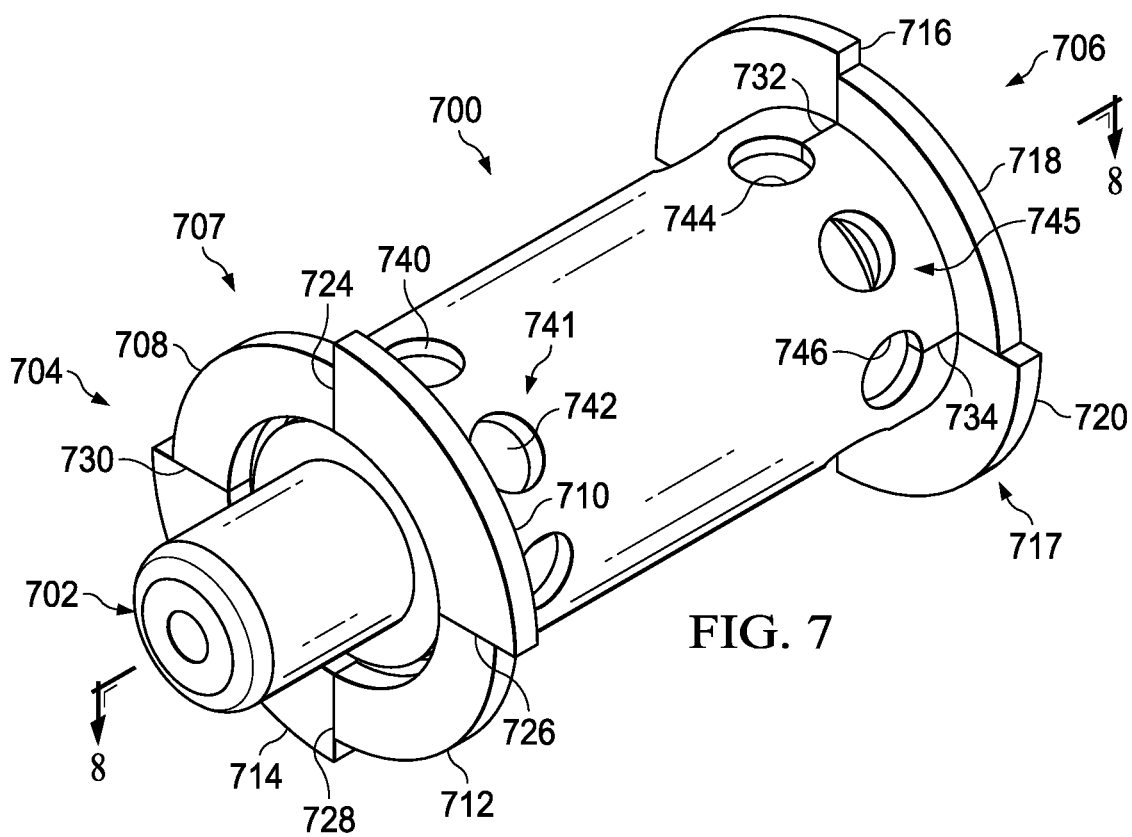
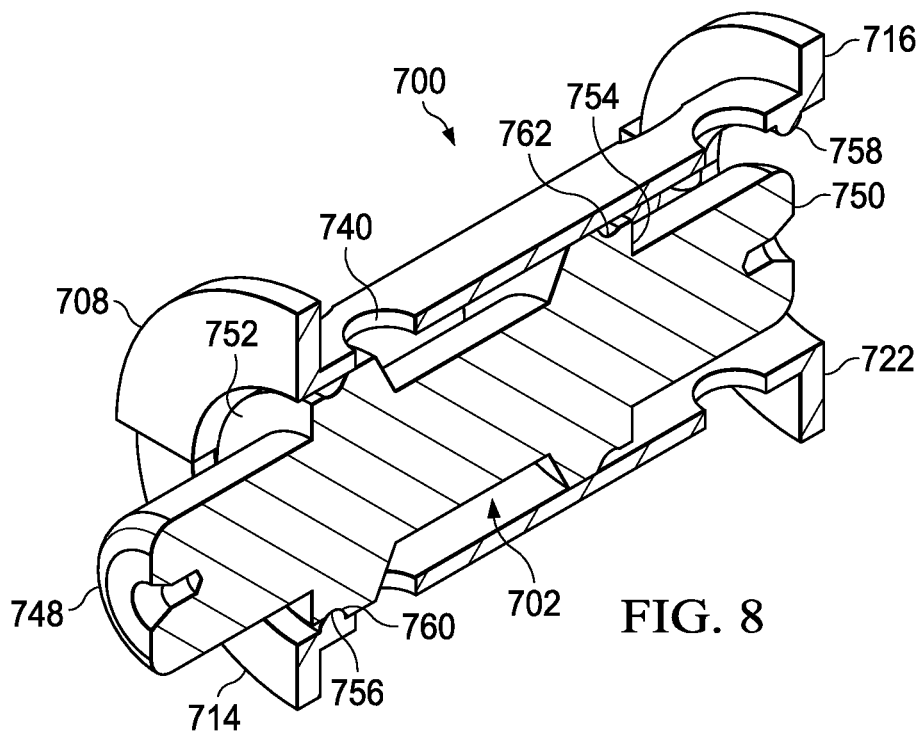
FIG. 7
FIG. 8

SIMPLIFIED SHUTTLE VALVE DESIGN WITH SPOOL-SLEEVE ASSEMBLY

This application claims priority to U.S. provisional patent application 63/147,589, filed Feb. 9, 2021, the entirety of which is hereby incorporated by reference.

BACKGROUND

A shuttle valve is a hydraulic system component, which has two fluid inlets and one fluid outlet, but which enables fluid to flow only from one inlet to the outlet at a time. In other words, a shuttle valve either enables fluid to flow from a first inlet to the outlet, or to flow from the second inlet to the outlet, but not both concurrently. Depending on the relative fluid pressures in the two inlets, the shuttle valve is capable of switching fluid in-flow between the first and second inlets.

SUMMARY

One or more examples provide for a spool-sleeve assembly. The spool-sleeve assembly includes a sleeve having a first end, a second end, and a first inner radius. A first flange is integrally formed with the sleeve, outwardly extending from the first end. The first flange is segmented into a first plurality of flange segments via a first slit disposed in the first flange. A second flange is integrally formed with the sleeve, outwardly extending from the second end. The second flange is segmented into a second plurality of flange segments via a second slit disposed in the second flange. A first press fitting extends inwardly from an inner wall of the sleeve proximate the first end and the first slit. The sleeve has a second inner radius at the first press fitting, with the second inner radius being smaller than the first inner radius. A second press fitting extends inwardly from the inner wall of the sleeve proximate the second end and the second slit. The sleeve has a third inner radius at the second press fitting, the third inner radius being smaller than the first inner radius. A first hole is disposed through the sleeve between the first flange and the second flange. The spool-sleeve assembly also includes a spool slidably disposed inside the sleeve, the spool having a third end and a fourth end. A first ridge outwardly extends from the spool proximate the third end. The first ridge has a first outer diameter that is greater than the second inner radius. A first groove is disposed in the first ridge. A second ridge outwardly extends from the spool proximate the fourth end. The second ridge has a second outer diameter that is greater than the third inner radius. A second groove is disposed in the second ridge. The first press fitting is sized and dimensioned so that to at least a portion of the first press fitting fits in the first groove. The second press fitting is sized and dimensioned so that to at least a portion of the second press fitting fits in the second groove.

One or more examples also provide for a method of manufacturing. The method includes manufacturing a sleeve including a sleeve having a first end, a second end, and a first inner radius. A first flange is integrally formed with the sleeve, outwardly extending from the first end. The first flange is segmented into a first plurality of flange segments via a first slit disposed in the first flange. A second flange is integrally formed with the sleeve, outwardly extending from the second end. The second flange is segmented into a second plurality of flange segments via a second slit disposed in the second flange. A first press fitting extends inwardly from an inner wall of the sleeve proximate the first end and the first slit. The sleeve has a second inner radius at the first press fitting, with the second inner radius being smaller than the first inner radius. A second press fitting extends inwardly from the inner wall of the sleeve proximate the second end and the second slit. The sleeve has a third inner radius at the second press fitting, the third inner radius being smaller than the first inner radius. A first hole is disposed through the sleeve between the first flange and the second flange. The method also includes manufacturing a spool slidably disposed inside the sleeve. The spool includes a spool having a third end and a fourth end. A first ridge outwardly extends from the spool proximate the third end. The first ridge has a first outer diameter that is greater than the second inner radius. A first groove is disposed in the first ridge. A second ridge outwardly extends from the spool proximate the fourth end. The second ridge has a second outer diameter that is greater than the third inner radius. A second groove is disposed in the second ridge. The first press fitting is sized and dimensioned so that to at least a portion of the first press fitting fits in the first groove. The second press fitting is sized and dimensioned so that to at least a portion of the second press fitting fits in the second groove. The spool is inserted into the sleeve such that the first end of the sleeve acts as a first collet for the third end of the spool, and the second end of the sleeve acts as a second collet for the fourth end of the spool.

One or more examples also provide for an aircraft. The aircraft includes a fuselage and a hydraulic system connected to the fuselage. The aircraft also includes a shuttle valve operably connected to the hydraulic system, the shuttle valve including a spool-sleeve assembly. The spool-sleeve assembly includes a sleeve including a sleeve having a first end, a second end, and a first inner radius. A first flange is integrally formed with the sleeve, outwardly extending from the first end. The first flange is segmented into a first plurality of flange segments via a first slit disposed in the first flange. A second flange is integrally formed with the sleeve, outwardly extending from the second end. The second flange is segmented into a second plurality of flange segments via a second slit disposed in the second flange. A first press fitting extends inwardly from an inner wall of the sleeve proximate the first end and the first slit. The sleeve has a second inner radius at the first press fitting, with the second inner radius being smaller than the first inner radius. A second press fitting extends inwardly from the inner wall of the sleeve proximate the second end and the second slit. The sleeve has a third inner radius at the second press fitting, the third inner radius being smaller than the first inner radius. A first hole is disposed through the sleeve between the first flange and the second flange. The spool-sleeve assembly also includes a spool slidably disposed inside the sleeve, the spool including a spool having a third end and a fourth end. A first ridge outwardly extends from the spool proximate the third end. The first ridge has a first outer diameter that is greater than the second inner radius. A first groove is disposed in the first ridge. A second ridge outwardly extends from the spool proximate the fourth end. The second ridge has a second outer diameter that is greater than the third inner radius. A second groove is disposed in the second ridge. The first press fitting is sized and dimensioned so that to at least a portion of the first press fitting fits in the first groove. The second press fitting is sized and dimensioned so that to at least a portion of the second press fitting fits in the second groove.

Other examples of the subject matter, disclosed herein, will be apparent from the following description and the appended claims.

BRIEF DESCRIPTION OF DRAWINGS

FIG. 7 shows a view of the spool-sleeve assembly, in accordance with one or more examples.

FIG. 8 shows a first view of the spool-sleeve assembly, in accordance with one or more examples.

DETAILED DESCRIPTION

Figure 1:
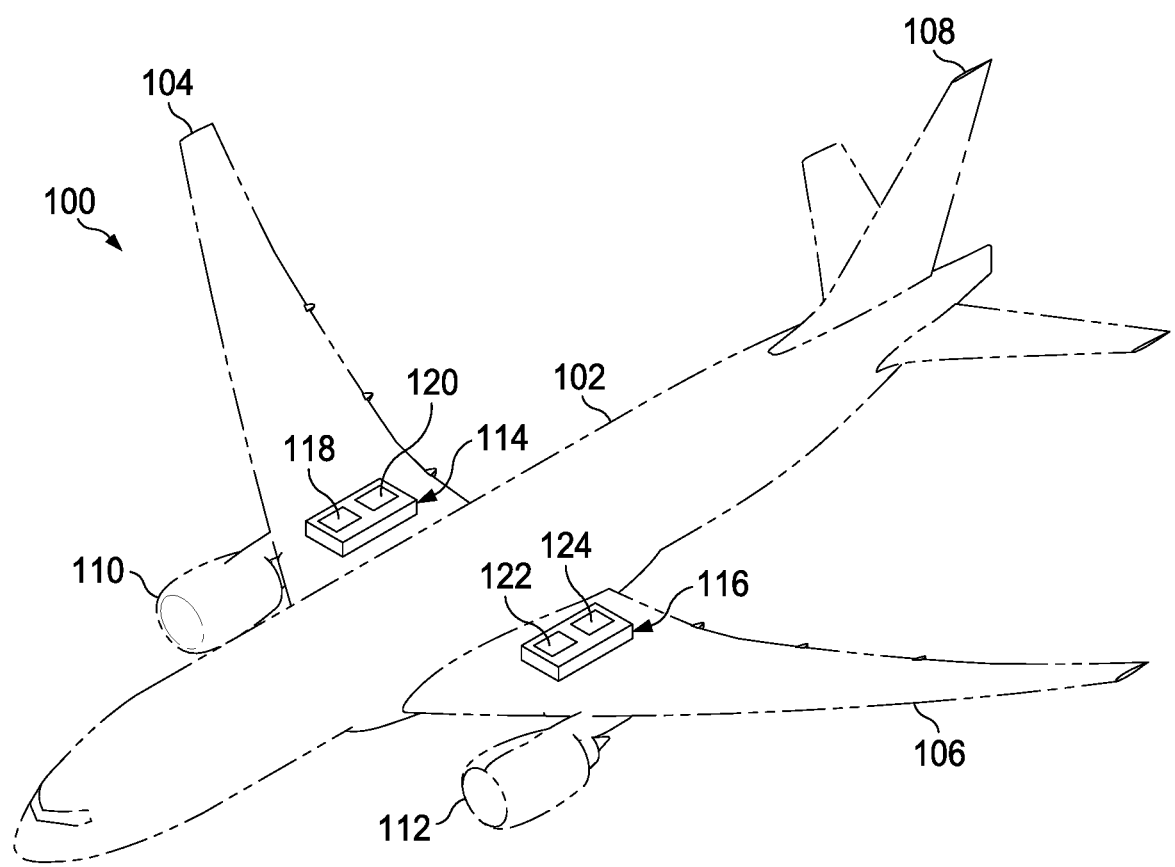
FIG. 1 shows an aircraft, in which the shuttle valve of one or more examples is placed, in accordance with one or more examples.

Specific examples will now be described in detail with reference to the accompanying figures. Like elements in the various figures are denoted by like reference numerals for consistency.

In the following detailed description of examples, numerous specific details are set forth in order to provide a more thorough understanding. However, it will be apparent to one of ordinary skill in the art that one or more examples are practiced without these specific details. In other instances, well-known features have not been described in detail to avoid unnecessarily complicating the description.

Throughout the application, ordinal numbers (e.g., first, second, third, etc.) are used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element in one or more examples encompass more than one element and succeed (or precede) the second element in an ordering of elements.

The term "about," when used with respect to a physical property that is measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles are "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other examples, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "proximate" means "within a pre-determined distance of." Thus, for example, if a first object is proximate a second object, then a pre-determined distance exists between the first object and the second object.

As used herein, the term "connected to" contemplates at least two meanings. In a first meaning, unless otherwise stated, "connected to" means that component A was, at least at some point, separate from component B, but then was later joined to component B in either a fixed or removably attached arrangement. In a second meaning, unless otherwise stated, "connected to" means that component A could have been integrally formed with component B. Thus, for example, assume a bottom of a pan is "connected to" a wall of the pan. The term "connected to" is interpreted as the bottom and the wall being separate components that are snapped together, welded, or are otherwise fixedly or removably attached to each other. Additionally, the term "connected to" also is interpreted as the bottom and the wall being contiguously together as a monocoque body formed by, for example, a molding process. In other words, the bottom and the wall, in being "connected to" each other, could be separate components that are brought together and joined, or in one or more examples is a single piece of material that is bent at an angle so that the bottom panel and the wall panel are identifiable parts of the single piece of material.

In general, examples relate to an improved, simplified shuttle valve design with a spool-sleeve assembly. The spool-sleeve assembly of one or more examples has improved durability relative to known shuttle valves, as well as fewer leaks and greater operational control of the shuttle valve. One or more examples use simplified retainers accompanied by a sealing system arrangement. For internal locking of spool, existing detent mechanisms using a spring disc and steel ball is eliminated and redesigned with a press fitting lock between a circular pad feature and a T-seal friction. One or more examples also provide for a metal to metal sealing between a hole feature of a retainer and a curved feature of a spool end. Thus, the overall performance characteristic of shuttle valve are improved at a reduced cost.

FIG. 1 shows an aircraft in which the shuttle valve of one or more examples is placed, in accordance with one or more examples. The aircraft (100) includes a fuselage (102), a first wing (104), a second wing (106), and a tail (108). The aircraft (100) in one or more examples includes a propulsion system, such as first engine (110) and second engine (112). The aircraft in one or more examples is contains one or more hydraulic systems, such as first hydraulic braking system (114) and second hydraulic braking system (116). The hydraulic braking systems in one or more examples is each contain one or more shuttle valves. For example, the first hydraulic braking system (114) includes a first shuttle valve (118) and a second shuttle valve (120), and the second hydraulic braking system (116) includes a third shuttle valve (122) and a fourth shuttle valve (124). The aircraft (100) in one or more examples includes additional components, in addition to those described above.

Figure 2:
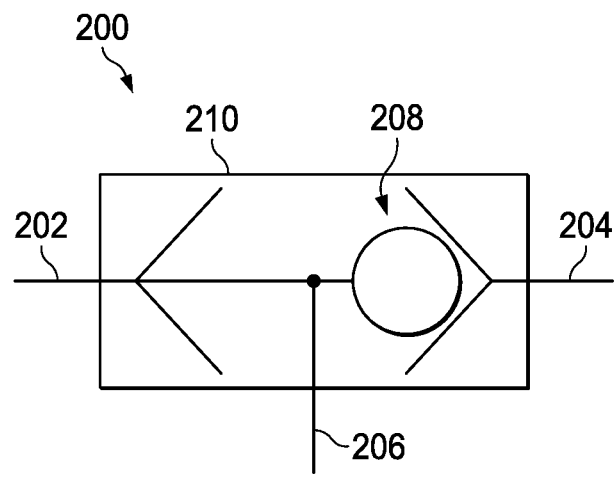
FIG. 2 shows a symbol of a shuttle valve, in accordance with one or more examples.

FIG. 2 shows a symbol of a shuttle valve, in accordance with one or more examples. The shuttle valve (200) in one or more examples is any of the first shuttle valve (118), the second shuttle valve (120), the third shuttle valve (122) and the fourth shuttle valve (124) of FIG. 1. The shuttle valve (200) includes a first inlet (202), a second inlet (204), and an outlet (206). Fluid flows from either the first inlet (202), through a manifold chamber (210), and to the outlet (206); or, the fluid flows from the second inlet (204), through the manifold chamber (210), and to the outlet (206). However, fluid does not concurrently flow from both the first inlet (202) and the second inlet (204) concurrently. A shuttle assembly (208) within the shuttle valve (200) blocks one of the first inlet (202) or the second inlet (204), depending on the pressure in the two inlets.

When the pressure in one of the inlets exceeds a threshold pressure relative to the other inlet, then the shuttle assembly (208) is forced to the opposite inlet. In the example of FIG. 2, the pressure in the first inlet (202) is higher than the threshold pressure relative to the second inlet (204). Thus, the shuttle assembly (208) blocks the second inlet (204), enabling fluid to flow from the first inlet (202) to the outlet (206).

Figure 3:
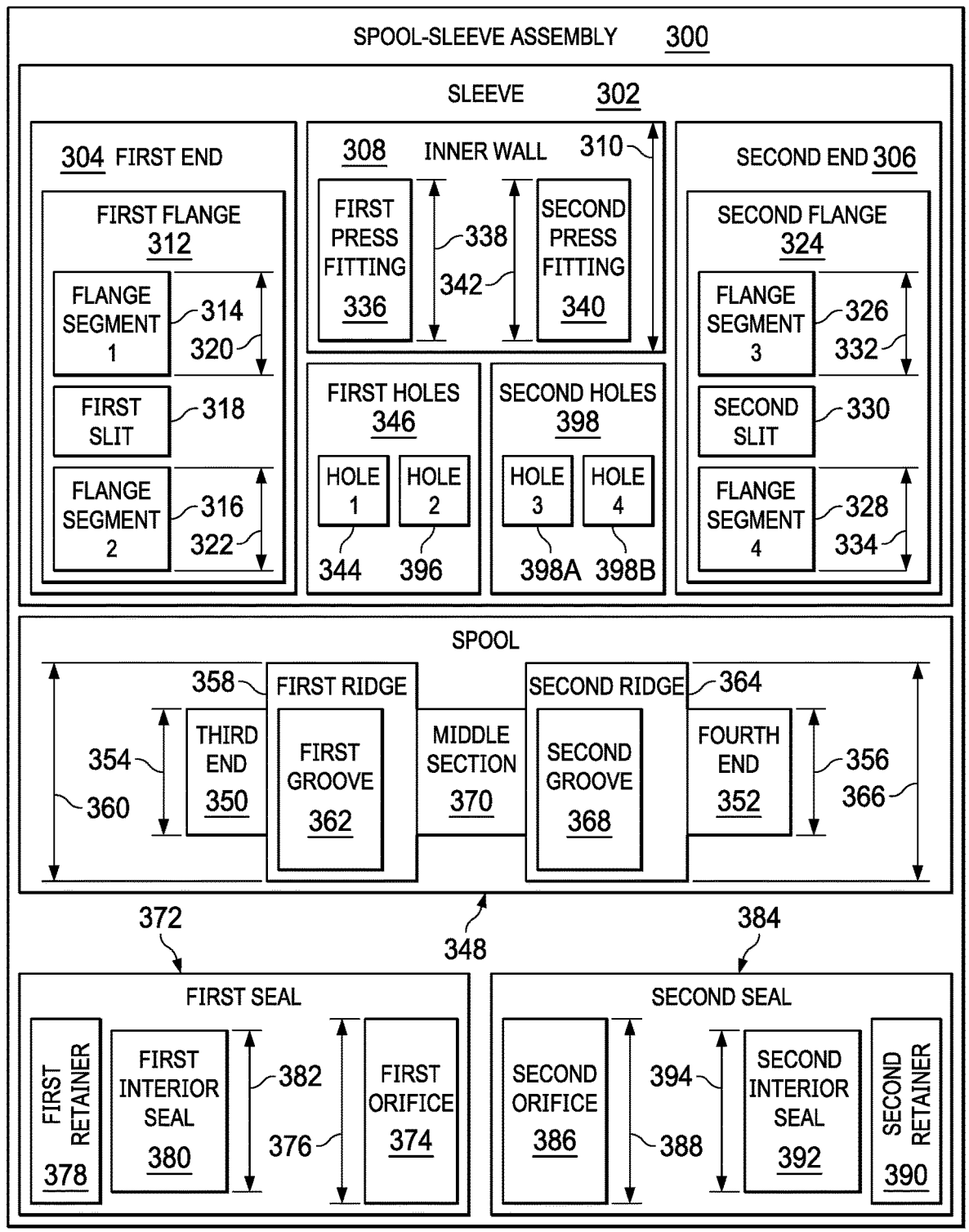
FIG. 3 shows a block diagram of a spool-sleeve assembly, in accordance with one or more examples.

FIG. 3 shows a block diagram of a spool-sleeve assembly, in accordance with one or more examples. The spool-sleeve assembly (300) in one or more examples is part of the shuttle assembly (208) shown in FIG. 2, and thus in one or more examples is one of the components in the shuttle valves shown in FIG. 1.

The spool-sleeve assembly (300) includes a sleeve (302), which in one or more examples is characterized as a first body having a hollow core. The sleeve (302) is a section of hollow material having a first end (304), a second end (306), and an intermediate section in-between that is defined by a first inner wall (308) having a first inner radius (310).

A first flange (312) is integrally formed with the sleeve (302), outwardly extending from the first end (304). The first flange (312) is segmented into flange segments, such as flange segment 1 (314) and flange segment 2 (316), via a first slit (318) disposed in the first flange (312). The flange segment 1 (314) in one or more examples has a first flange outer radius (320). The flange segment 2 (316) in one or more examples has a second flange outer radius (322).

Similarly, a second flange (324) is integrally formed with the sleeve (302), outwardly extending from the second end (306). The second flange (324) is segmented into flange segments, such as flange segment 3 (326) and flange segment 4 (328), via a second slit (330) disposed in the second flange (324). The flange segment 3 (326) has a third flange outer radius (332). The flange segment 4 (328) has a fourth flange outer radius (334).

A first press fitting (336) extends inwardly from the first inner wall (308) of the middle section of the sleeve (302), proximate the first end (304) and the first slit (318). The sleeve (302) has a second inner radius (338) at the first press fitting (336). The second inner radius (338) is smaller than the first inner radius (310).

Similarly, a second press fitting (340) extends inwardly from the first inner wall (308) of the sleeve (302) proximate the second end (306) and the second slit (330). The sleeve (302) has a third inner radius (342) at the second press fitting (340). The third inner radius (342) is smaller than the first inner radius (310).

One or more holes (are disposed in the sleeve (302). For example, at a minimum, a first hole (344), among possibly one or more additional holes in addition to first holes (346), is disposed through the sleeve (302) between the first flange (312) and the second flange (324).

The spool-sleeve assembly (300) in one or more examples also includes a spool. The spool (348) in one or more examples is characterized as a second body which is sized and dimensioned to fit within the hollow core of the sleeve (302). The spool is slidably disposed inside the sleeve (302). The spool (348) has a third end (350) and a fourth end (352). The third end (350) has a third outer diameter (354). The fourth end (352) has a fourth outer diameter (356).

A first ridge (358) outwardly extends from the spool (348) proximate the third end (350). The first ridge has a first outer diameter (360) that is greater than the second inner radius (338), and a first groove (362) disposed in the first ridge (358).

Likewise, a second ridge (364) outwardly extends from the spool (348) proximate the fourth end (352). The second ridge (364) has a second outer diameter (366) that is greater than the third inner radius (342), and a second groove (368) disposed in the second ridge (364).

The first press fitting (336) is sized and dimensioned so that to at least a portion of the first press fitting (336) fits in the first groove (362). Similarly, the second press fitting (340) is sized and dimensioned so that to at least a portion of the second press fitting (340) fits in the second groove (368).

The spool-sleeve assembly (300) described above in one or more examples is varied. For example, the flange segments on the first end (304) include at least the flange segment 1 (314) and the flange segment 2 (316), as well as possibly other flange segments. The flange segment 1 (314) in one or more examples has a first flange outer radius (320) that is greater than the second flange outer radius (322) of the flange segment 2 (322). In other words, the flanges in one or more examples are differently sized, having greater or lesser radii relative to each other.

Similarly, the flange segments on the second end (306) include at least the flange segment 3 (326) and the flange segment 4 (328), as well as possibly other flange segments. The flange segment three (326) in one or more examples have a third flange outer radius (332) that is greater than the fourth flange outer radius (334) of the flange segment 4 (328). Thus, the flange segment 3 (326) and the flange segment 4 (328) in one or more examples is differently sized, having different radii. However, in an example, the first flange outer radius (320) in one or more examples is equal to the third flange outer radius (332). In other words, opposing flanges at the first end (304) and the second end (306) in one or more examples has the same radii, if desired for a particular implementation to set the sleeve (302) within a shuttle valve manifold chamber.

A middle section (370) in one or more examples extends between the first ridge (358) and the second ridge (364). The middle section (370) extends the overall length of the spool (348).

The spool-sleeve assembly (300) in one or more examples includes additional components. For example, a first seal (372) in one or more examples is disposed at the first end (304) of the sleeve (302). The first seal (372) in one or more examples is configured to receive the third end (350) of the spool (348).

The first seal (372) in one or more examples also includes first orifice (374) that receives the third end (350) of the spool (348). The first orifice (374) has a first radius (376) that is equal to the third outer diameter (354) of the third end (350) and also that is smaller than the first outer diameter (360) of the first ridge (358). The first seal (372) in one or more examples also includes a first retainer (378) disposed opposite the first orifice (374). The first retainer (378) in one or more examples is sized and dimensioned to retain the third end (350) of the spool (348). The first seal (372) in one or more examples further includes a first interior seal (380) having a first interior seal radius (382) equal to the third outer diameter (354) of the third end (350) of the spool (348) of the spool.

Similarly, a second seal (384) in one or more examples is disposed at the second end (306) of the sleeve (302). The second seal (384) in one or more examples is configured to receive the fourth end (352) of the spool (348). The second seal (384) comprises a second orifice (386) that receives the fourth end (352) of the spool (348). The second orifice (386) in one or more examples has a second radius (388) that is equal to a fourth outer diameter (356) of the fourth end (352) and also that is smaller than the second outer diameter (366) of the second ridge (364). The second seal (384) in one or more examples includes a second retainer (390) disposed opposite the second orifice (386). The second retainer (390) in one or more examples is sized and dimensioned to retain the fourth end (352) of the spool (348). The second seal (384) in one or more examples further includes a second interior seal (392) having a second interior seal radius (394) equal to the fourth outer diameter (356) of the fourth end (352) of the spool (348) of the spool.

Still other variations are possible. For example, more holes in one or more examples is provided in different locations in the sleeve (302). Specifically, the first holes (346) in one or more examples is radially disposed around the sleeve (302), distally of one of the first flange (312) and the second flange (324). The first holes (346) in one or more examples includes both the first hole (344) and one more additional holes, such as a second hole (396). Similarly, second holes (398) in one or more examples is radially disposed around the sleeve (302), distally of the second flange (324). However, in this case, the first hole (344) in one or more examples is either one of the first holes (346) or the second holes (398). Stated differently, the term "first hole" should not be limited to the holes located near the first end (304), but could be located near the second end (306) of the sleeve (302).

Yet other variations are possible. For example, the first slit (318) in one or more examples penetrates the first flange (312) to one of the first holes (346). The second slit in one or more examples is also penetrates the second flange (324) to one of the second holes (398).

The sleeve (302) in one or more examples has a variety of different shapes. For example, the sleeve (302) of the sleeve in one or more examples is a first cylindrical body. However, other shapes are contemplated, including rectangular and more complex shapes. The first press fitting (336) in one or more examples is a ring disposed radially around the first inner wall (308) of the first cylindrical body. The second press fitting (340) in one or more examples is disposed radially around the first inner wall (308) of the first cylindrical body.

Similarly, the spool (348) in one or more examples has different shapes. For example, the spool (348) in one or more examples is a second cylindrical body. However, other shapes are contemplated, including rectangular and more complex shapes. However, the shape of the spool (348) is sized and dimensioned to enable the spool (348) to slide back and forth within the sleeve (302). The first ridge (358) in one or more examples is a ring extending radially from the second cylindrical body. Likewise, the second ridge (364) in one or more examples extends radially from the second cylindrical body.

In a related example, the first groove (362) in one or more examples is a first radial groove disposed in the first ridge (358). Similarly, the second groove (368) in one or more examples is a second radial groove disposed in the second ridge (364).

In one or more examples, the third end (350) of the spool (348) in one or more examples is one of a filleted third end and a chamfered third end. However, the third end (350) in one or more examples has different shapes. Similarly, the fourth end (352) of the spool (348) in one or more examples is one of a filleted fourth end and a chamfered fourth end. However, the fourth end (352) in one or more examples have different shapes. The shapes of the third end (350) and the fourth end (352) of the spool (348) need not be the same.

The spool-sleeve assembly (300) in one or more examples is an operable part of a shuttle valve, such as the shuttle valve shown in FIG. 2. As described in FIG. 2, the shuttle valve in one or more examples includes a first inlet port to a manifold chamber, a second inlet port to the manifold chamber, and an outlet port from the manifold chamber. In this case, the third end (350) of the spool (348) is configured to block the first inlet port in a first position of the spool (348). The fourth end (352) of the spool (348) is configured to block the second inlet port in a second position of the spool (348). Furthermore, the first hole (344) establishes fluid communication between the outlet port and the second inlet port in the manifold chamber when the spool (348) is in the first position, but establishes fluid communication between the outlet port and the first inlet port in the manifold chamber when the spool (348) is in the second position. This example is shown in detail in the examples of FIG. 18 through FIG. 20.

While FIG. 3 shows a configuration of components, other configurations in one or more examples is used without departing from the scope. For example, various components in one or more examples is combined to create a single component. In one or more examples, the functionality performed by a single component in one or more examples is performed by two or more components.

Figure 4:
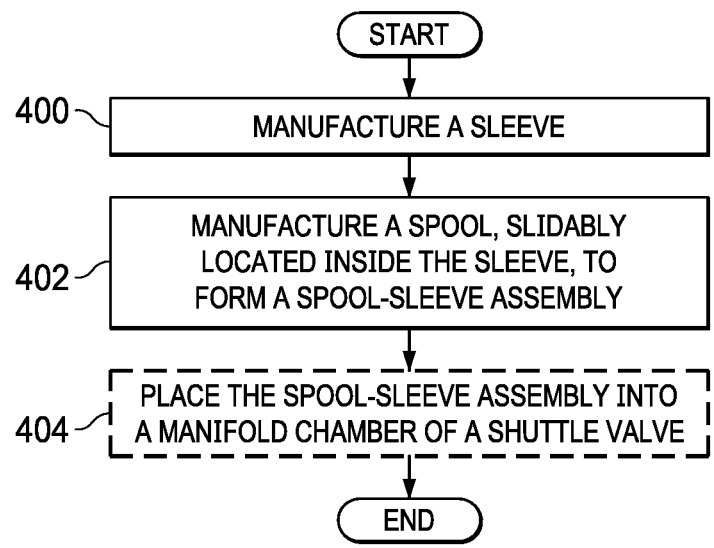
FIG. 4 shows a flowchart of a manufacturing method, in accordance with one or more examples.

FIG. 4 shows a flowchart of a manufacturing method, in accordance with one or more examples. The method of FIG. 4 in one or more examples is used to manufacture the spool-sleeve assembly (300) of FIG. 3 or the shuttle valve (200) of FIG. 2. The method of FIG. 4 in one or more examples also is used during the maintenance or manufacture of the aircraft (100) of FIG. 1. Various manufacturing techniques in one or more examples are used, including additive manufacturing, injection molding, Step 400 includes manufacturing a sleeve including a body having a first end, a second end, a first flange at the first end, a second flange at the second end, a first press fitting extends inwardly from an inner wall, a second press fitting extends inwardly from the inner wall, and a first hole disposed through the body between the first flange and the second flange. More fully, step 400 in one or more examples includes manufacturing a sleeve including a sleeve having a first end, a second end, and a first inner radius wherein: a first flange is integrally formed with the sleeve, outwardly extending from the first end, the first flange segmented into a first plurality of flange segments via a first slit disposed in the first flange, a second flange is integrally formed with the sleeve, outwardly extending from the second end, the second flange segmented into a second plurality of flange segments via a second slit disposed in the second flange, a first press fitting extends inwardly from an inner wall of the sleeve proximate the first end and the first slit, the sleeve having a second inner radius at the first press fitting, the second inner radius smaller than the first inner radius, a second press fitting extends inwardly from the inner wall of the sleeve proximate the second end and the second slit, the sleeve having a third inner radius at the second press fitting, the third inner radius smaller than the first inner radius, and a first hole is disposed through the sleeve between the first flange and the second flange.

Step 402 includes manufacturing a spool slidably disposed inside the sleeve, the spool having a third end and a fourth end, a first ridge outwardly extending from the spool proximate the third end, a second ridge outwardly extending from the spool proximate the fourth end, a first groove in the first ridge, and a second groove in the second ridge, wherein the spool is inserted into the sleeve such that the first end of the sleeve acts as a first collet for the third end of the spool, and the second end of the sleeve acts as a second collet for the fourth end of the spool. More fully, step 402 in one or more examples includes manufacturing a spool slidably disposed inside the sleeve, the spool having a third end and a fourth end, wherein: a first ridge outwardly extends from the spool proximate the third end, the first ridge having a first outer diameter that is greater than the second inner radius, and a first groove disposed in the first ridge, a second ridge outwardly extends from the spool proximate the fourth end, the second ridge having a second outer diameter that is greater than the third inner radius, and a second groove disposed in the second ridge, the first press fitting is sized and dimensioned so that to at least a portion of the first press fitting (336) fits in the first groove, and the second press fitting is sized and dimensioned so that to at least a portion of the second press fitting (340) fits in the second groove; wherein the spool is inserted into the sleeve such that the first end of the sleeve acts as a first collet for the third end of the spool, and the second end of the sleeve acts as a second collet for the fourth end of the spool.

The method of FIG. 4 in one or more examples terminates thereafter. However, the method of FIG. 4 in one or more examples is further varied.

For example, optionally at step 404, the method in one or more examples includes placing the spool-sleeve assembly into a manifold chamber of a shuttle valve. In this case, the shuttle valve further includes a first inlet port, a second inlet port, and an outlet port. The third end of the spool is configured to block the first inlet port in a first position of the spool. The fourth end of the spool is configured to block the second inlet port in a second position of the spool. The first hole establishes fluid communication between the outlet port and the second inlet port in the manifold chamber when the spool is in the first position, but establishes fluid communication between the outlet port and the first inlet port in the manifold chamber when the spool is in the second position.

The various steps in this flowchart are presented and described sequentially. However, one of ordinary skill will appreciate that some or all of the steps in one or more examples is executed in different orders, in one or more examples is combined or omitted, and some or all of the steps in one or more examples is executed in parallel.

Figure 5:
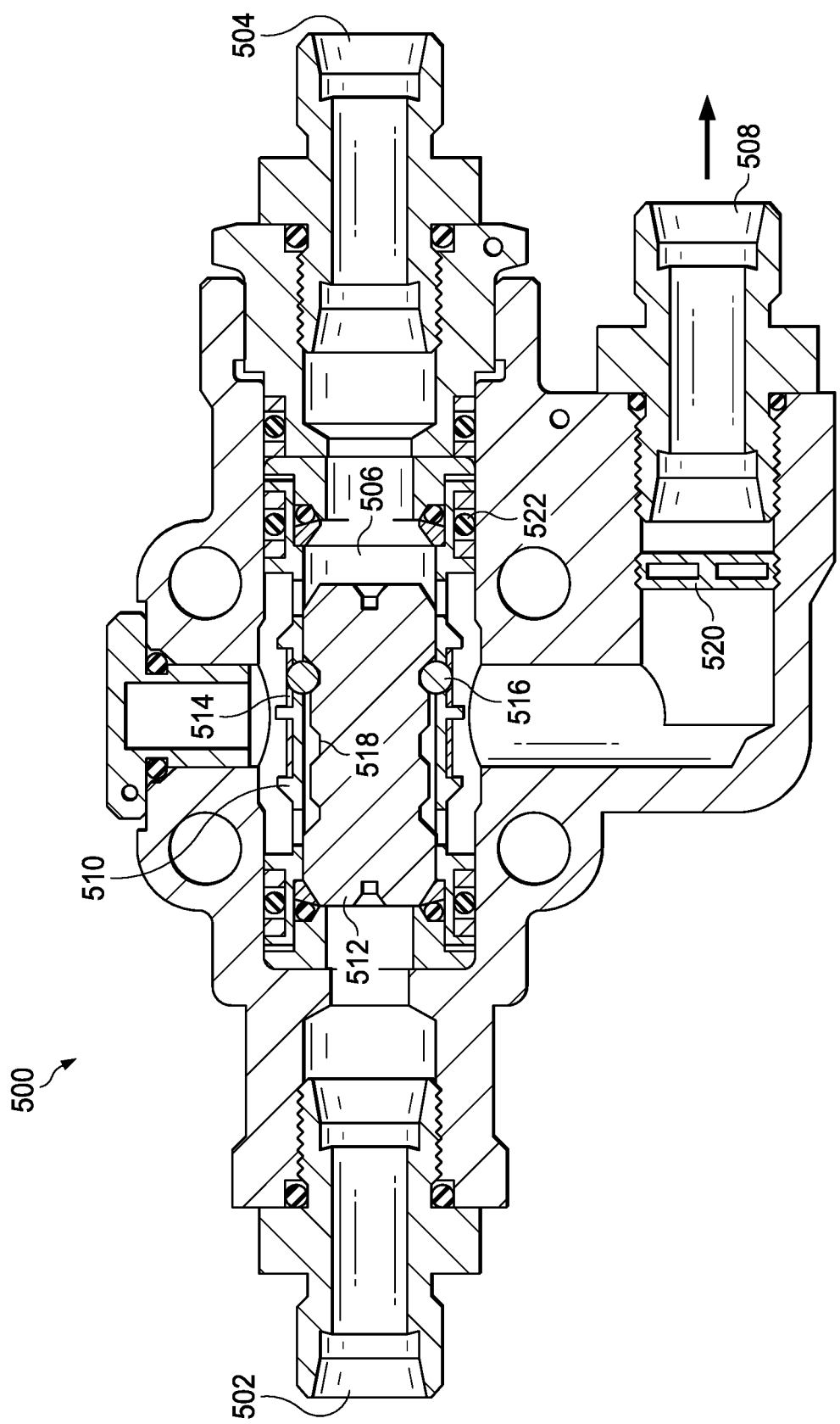
FIG. 5 shows a shuttle valve.

FIG. 5 shows a shuttle valve. The shuttle valve (500) includes a first inlet (502) and a second inlet (504) that enable fluid to flow into a manifold chamber (506). An outlet (508) enables fluid to flow out of the manifold chamber (506).

A sleeve (510) in the manifold chamber (506) retains a spool (512). The spool in one or more examples slides back and forth between the first inlet (502) and the second inlet (504), depending on the changing fluid pressures in the two inlets. In a first position, shown in FIG. 5, the spool (512) blocks the first inlet (502). In a second position, not shown in FIG. 5, the spool (512) blocks the second inlet (504).

The spool (512) is urged to remain in either position due to a c-spring (514) which receives and pushes down on a retaining feature (516) in contact with the spool (512). The retaining feature (516) is disposed in a slot in the sleeve (510). When the fluid pressure from the first inlet (502) becomes higher than a threshold pressure difference relative to the fluid pressure from the second inlet (504), the retaining feature (516) is pushed against the side of the inlet in which the spool (512) is located. The retaining feature (516) either deforms (is squeezed), or otherwise is forced to roll out of the inlet. As a result, the spool (512) of the shuttle valve moves to a new position where an additional groove (518) in the spool (512) receives the retaining feature (516). Again, the c-spring (514) retains the retaining feature (516), but now in the second position.

However, the shuttle valve (500) shown in FIG. 5 has a number of issues. The c-springs in one or more examples becomes worn and in one or more examples enable the retaining feature (516) to break away and fall into the outlet (508). Thus, a strainer disk (520) is present to prevent the retaining feature (516) from moving into other parts of the hydraulic system, in the event the retaining feature (516) becomes loose. In the meantime, the shuttle valve (500) in one or more examples operate outside of engineering tolerances, and thus in one or more examples require maintenance and/or replacement, which in one or more examples are costly procedures.

In one or more examples an issue of the shuttle valve (500) is that several seals, such as seals (522), are needed to ensure no fluid leaks. Each of the seals in one or more examples are subject to costly maintenance procedures.

FIG. 6 through FIG. 23 show various different specific examples of sleeve-spool assemblies placed in a shuttle valve. The following examples are for explanatory purposes only and not intended to limit the scope of other examples of one or more examples.

Figure 6:
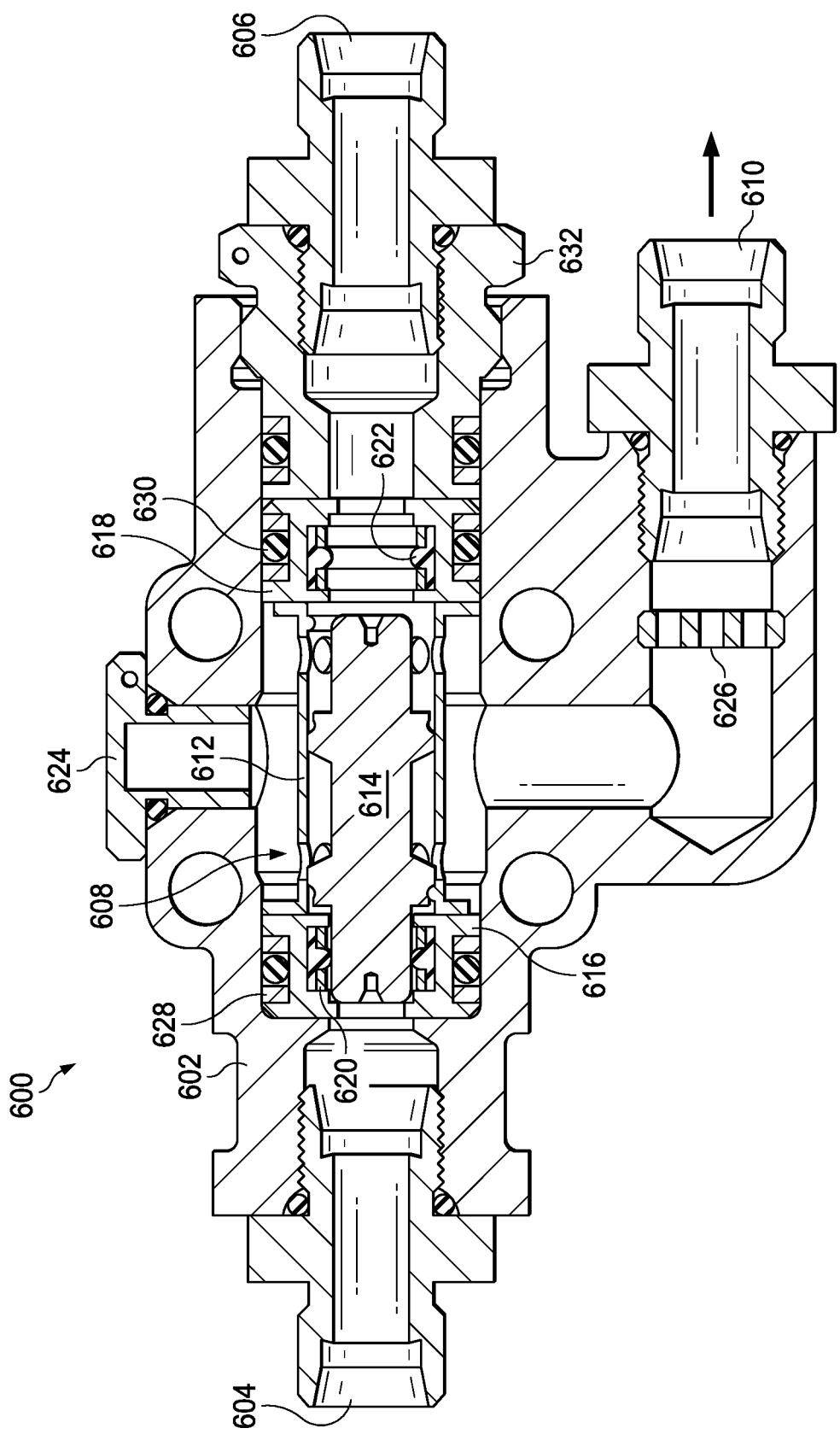
FIG. 6 shows a shuttle valve, having a spool-sleeve assembly, in accordance with one or more examples.

FIG. 6 shows a shuttle valve having a spool-sleeve assembly, in accordance with one or more examples. The shuttle valve (600) has a housing (602), which includes a first inlet (604) and a second inlet (606) that enable fluid to flow into a manifold chamber (608). An outlet (610) enables fluid to flow out of the manifold chamber (608).

The shuttle valve (600) includes several features within the manifold chamber (608) which improve on the shuttle valve (500) shown in FIG. 5. In particular, one or more examples include a spool-sleeve assembly which includes a sleeve (612) and a spool (614) slidably disposed inside the sleeve (612). In addition, the shuttle valve (600) includes a different type of retainer, including first retainer (616) and second retainer (618). Additional seals, including first seal (620) and second seal (622) are disposed inside the first retainer (616) and the second retainer (618), respectively. The details of these features are described with respect to FIG. 7 through FIG. 17.

The shuttle valve (600) in one or more examples has several optional features. For example, a plug (624) in one or more examples is disposed in a fourth hole through the housing (602) and into the manifold chamber (608). However the plug (624) in one or more examples is not present.

In one or more examples, the shuttle valve (600) also includes a strainer disk (626). The strainer disk (626) in one or more examples is sized and dimensioned to eliminate particles or foreign object debris (FOD) from operating fluid entering the outlet (610). Note, however, that in the example shown in FIG. 6, there is no retaining feature, such as the retaining feature (516) shown in FIG. 5. Thus, there is no possibility that a retaining feature of the shuttle valve (600) in one or more examples becomes foreign object debris in one or more examples.

Other optional features in one or more examples are present, such as first O-ring (628) and second O-ring (630). The O-rings in one or more examples serve as back-up seals for the first retainer (616) and the second retainer (618), respectively. An adapter (632) in one or more examples is disposed between an inlet and the manifold chamber (608), such as the adapter (632) being shown between the second inlet (606) and the manifold chamber (608). Still other optional features are present in one or more examples.

Figure 9:
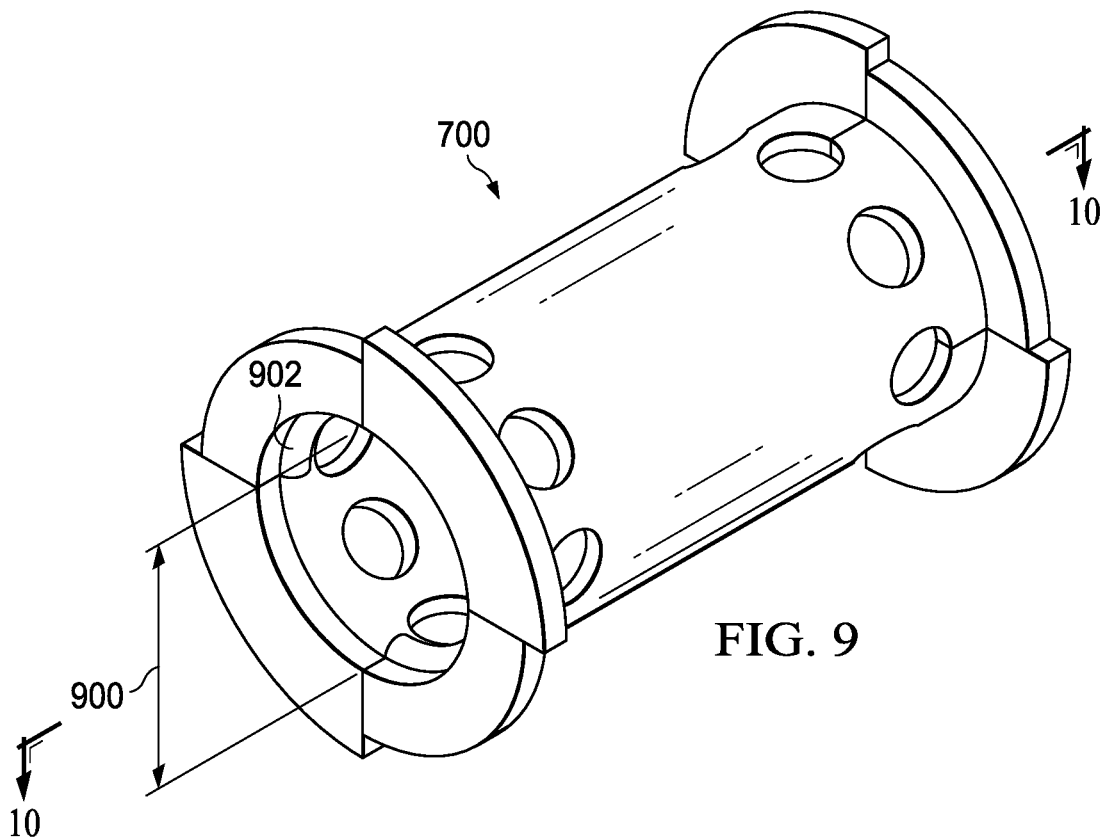
FIG. 9 shows a second view of the sleeve of the spool-sleeve assembly, in accordance with one or more examples.
Figure 10:
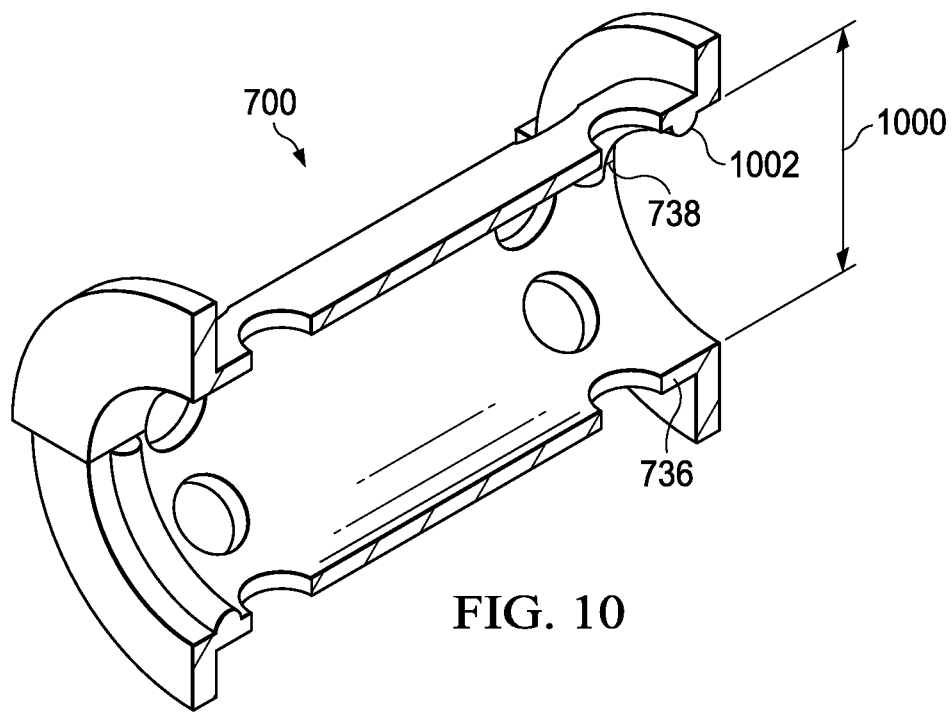
FIG. 10 shows a view of the sleeve of the spool-sleeve assembly, in accordance with one or more examples.
Figure 11:
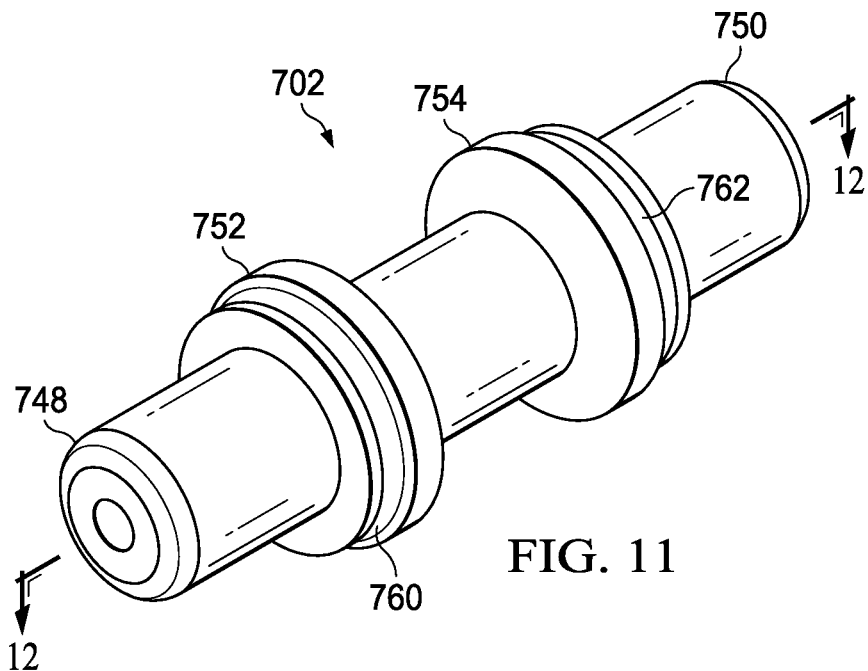
FIG. 11 shows a view of the spool of the spool-sleeve assembly, in accordance with one or more examples.
Figure 12:
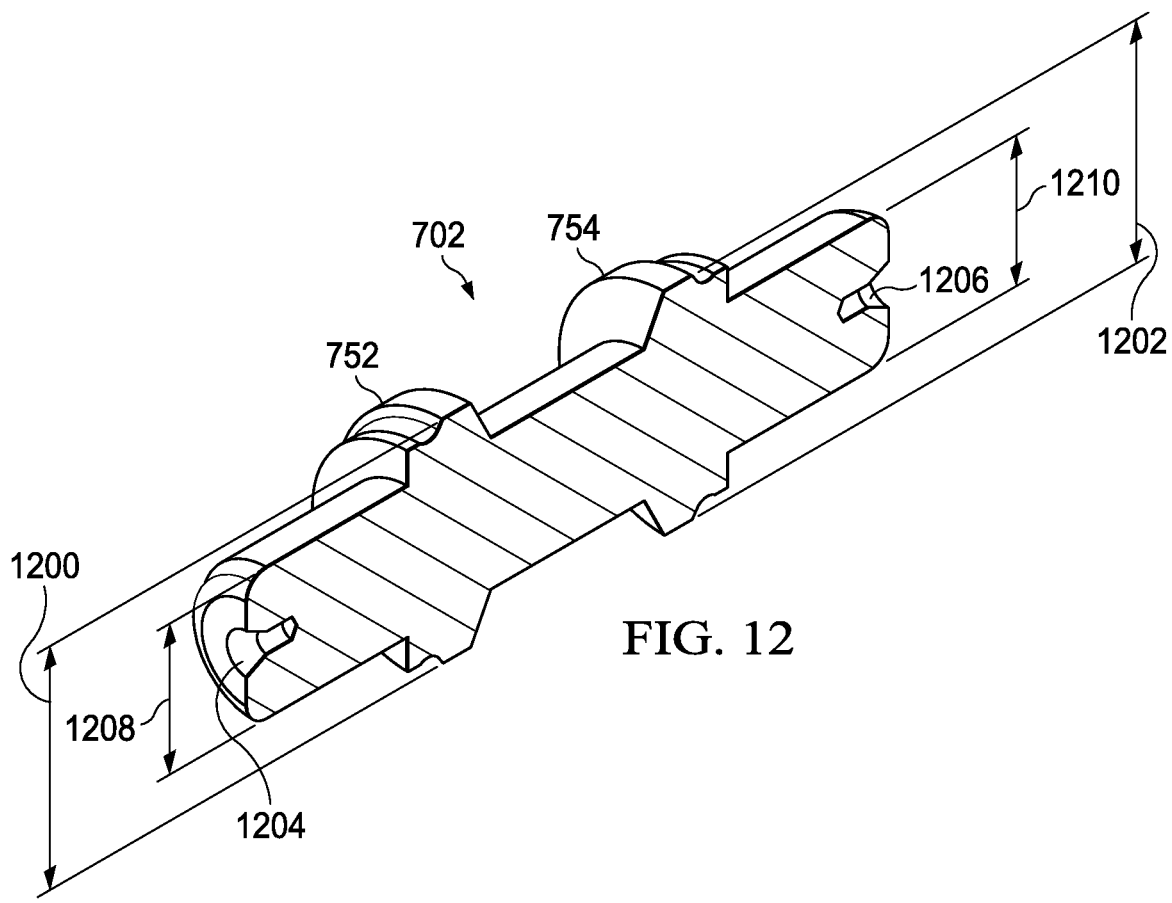
FIG. 12 shows a view of the spool of the spool-sleeve assembly, in accordance with one or more examples.

FIG. 7 through FIG. 12 should be considered together, and thus share common reference numerals referring to common objects. FIG. 7 shows a view of the spool-sleeve assembly, in accordance with one or more examples. FIG. 8 shows a first view of the spool-sleeve assembly, in accordance with one or more examples. FIG. 9 shows a second view of the sleeve of the spool-sleeve assembly, in accordance with one or more examples. FIG. 10 shows a view of the sleeve of the spool-sleeve assembly, in accordance with one or more examples. FIG. 11 shows a view of the spool of the spool-sleeve assembly, in accordance with one or more examples. FIG. 12 shows a view of the spool of the spool-sleeve assembly, in accordance with one or more examples. In each of FIG. 7 through FIG. 12, the sleeve (700) in one or more examples is sleeve (612) in FIG. 6 and the spool (702) in one or more examples is spool (614) in FIG. 6.

Turning first to FIG. 7, the sleeve (700) is shown surrounding a spool (702). The sleeve (700) includes a number of features, including a first set of flanges at a first end (704) of the sleeve (700) and a second set of flanges at a second end (706) of the sleeve (700). Each set of flanges is divided by one or more slits.

Thus, for example, FIG. 7 shows that the first end (704) includes a first plurality of flange segments (707). The first plurality of flange segments (707) includes four flanges: first flange (708), second flange (710), third flange (712), and fourth flange (714). Similarly, the second end (706) includes a second plurality of flanges (717). The second plurality of flanges includes four flanges: fifth flange (716), sixth flange (718), seventh flange (720), and eighth flange (722) (see FIG. 8). More or fewer flanges in one or more examples are present, but in an example at least two flanges are present. The number of flanges present at each end need not be the same, but in an example the number of flanges in the first set of flanges and the second set of flanges is the same.

As mentioned above, slits divide the flanges, though the individual flanges in one or more examples are still touching each other in an example. The slits enable the flanges to expand radially, thereby causing the sleeve (700) to act as a collet at both the first end (704) and the second end (706) of the sleeve (700). As used herein, a "collet" is defined as a segmented band or sleeve put around a shaft, spindle, or spool, wherein the segments are tightened so as to grip at least some point on the shaft, spindle, or spool. At the first end (704), four slits are present: first slit (724), second slit (726), third slit (728), and fourth slit (730). Similarly, at the second end (706), four slits are present: fifth slit (732), sixth slit (734), seventh slit (736) (see FIG. 10), and eighth slit (738) (see FIG. 10).

Again, the slits divide the corresponding flanges as shown in FIG. 7 through FIG. 10. The length of the slits in one or more examples vary in order to increase or decrease the pressure the collet applies to certain parts of the spool (702), as described below with respect to FIG. 15 through FIG. 17. However, in an example, the slits in one or more examples extend to the holes disposed through the sleeve (700) at the first end (704) and the second end (706).

At least one hole is disposed through the sleeve (700) somewhere along the longitudinal length of the sleeve (700). The at least one hole enables fluid to flow from the non-blocked inlet to the outlet of the shuttle valve. However, multiple holes in one or more examples is present, if desired. In the example of FIG. 7 through FIG. 12, a first set of holes (741), including first hole (740) and second hole (742) along with other holes, is disposed near the first end (704), proximate the first set of flanges. Likewise, a second set of holes (745), including third hole (744) and fourth hole (746) along with other holes, is disposed near the second end (706), proximate the second set of flanges.

With respect to both sets of holes, the terms "proximate" and "near" are quantifiably determinable, but depend on the specific engineering parameters desired for a particular implementation. In one example, the terms "proximate" and "near" mean within a pre-defined distance which is generally closer to one component relative to a center of the sleeve (700). Thus, for example, the first hole (740) is "proximate" the first end (704) and "near" the first flange (708) and the second flange (710) because the first hole (740) is closer to the first end (704), the first flange (708), and the second flange (710) than the first hole (740) is to a longitudinal center of the sleeve (700). Thus, the positions of the holes need not be as shown in FIG. 7, but in one or more examples is are closer to the respective ends, or in one or more examples are closer to the longitudinal center of the sleeve (700).

One design parameter for determining the placement of the holes is the relative longitudinal length of the slits. The slits in one or more examples extend into the holes, thereby effectively increasing the longitudinal length of a corresponding flange segment. For example, consider how fourth hole (746) effectively extends the length of the sixth flange (718) initially defined by the sixth slit (734). A corresponding extension occurs by the fact that the fifth slit (732) extends into the third hole (744). As a result, the overall longitudinal length of the sixth flange (718) is extended, which in turn affects the amount of radial force the sixth flange (718) applies to a certain portion of the spool (702) when the sleeve (700) acts as a collet, as explained further below in FIG. 15 through FIG. 17. Thus, the holes in one or more examples are determined to be "proximate" the ends and "near" the flanges to a numerical degree that accomplishes a specified overall pre-determined longitudinal length of a flange segment. For this reason, the terms "proximate" and "near" as used herein are quantifiably determinable by an engineer designing a specific spool-sleeve assembly for a particular pressure in a particular hydraulic system, and should not be considered as being "just anywhere" in the sleeve (700).

As shown in FIG. 7, the flange segments need not be of equal size. In particular, in the specific example shown in FIG. 7, for a given side of the sleeve (700), an even number of flange segments are radially larger than an equal even number of flange segments on the same side. Thus, for example, on the first end (704), the second flange (710) and the fourth flange (714) are radially larger than the first flange (708) and the third flange (712). Similarly, on the second end (706), the fifth flange (716) and the seventh flange (720) are radially larger than the sixth flange (718) and the eighth flange (722). Note that the circumferential length of each flange segment is the same in the specific example of FIG. 7; however, on each side, a first radial outer diameter of half of the flange segments is greater than a second radial outer diameter of the other half of the flange segments.

The shapes and dimensions shown in FIG. 7 in one or more examples are varied. The radial outer diameters of each flange segment in one or more examples are varied, and need not be arranged in equal pairs, as shown. The circumferential length of each flange segment need not be the same, and indeed in one or more examples are all different. The number of holes in one or more examples is varied, and need not be evenly circumferentially distributed as shown in FIG. 7. Thus, one or more examples are not necessarily limited to the sleeve (700) shown in FIG. 7.

Attention is now turned to FIG. 8, which shows a cross-section of the spool (702) disposed inside the sleeve (700). FIG. 8 shows more of the details of the spool (702), which is slidably disposed inside the sleeve (700). The spool (702) is defined by a third end (748) and a fourth end (750). The terms "third" and "fourth" are used merely as identifier words to prevent confusion between the first end (704) of the sleeve (700) and the second end (706) of the sleeve (700), and do not otherwise convey special structural meaning.

Two ridges extend radially from the spool (702), including a first ridge (752) and a second ridge (754). The radial outer diameter of each ridge is smaller than the maximum radial inner diameter of the sleeve (700). However, the sleeve (700) includes two circumferentially extending press fittings, including at least a first press fitting (756) and a second press fitting (758). The press fittings are sized and dimensioned to fit within grooves in the ridges of the spool. Thus, for example, the first press fitting (756) is sized and dimensioned so that to at least a portion of the first press fitting (756) fits within a first groove (760) in the first ridge (752), and the second press fitting (758) is sized and dimensioned so that to at least a portion of the second press fitting (758) fits within a second groove (762) in the second ridge (754). Operation of the features of the spool (702) within the sleeve (700) are described with respect to FIG. 15 through FIG. 17.

The features shown in FIG. 8 in one or more examples are varied. For example, the press fittings in the sleeve (700) in one or more examples are one single circumferential press fitting, or in one or more examples are multiple partial circumferential press fittings, as shown in FIG. 9 and FIG. 10. In one or more examples, the longitudinal position of the ridges on the spool (702) and the longitudinal position of the grooves in the ridges in one or more examples is varied. Thus, one or more examples shown in FIG. 8 do not necessarily limit other examples.

FIG. 9 shows a second view of the sleeve (700) without the spool (702). FIG. 10 also shows the sleeve (700), but cut away to show additional features. For example, FIG. 9 shows that a second inner radius (900) is smaller than a first inner radius (1000) shown in FIG. 10. In other words, the inner diameter of the sleeve (700) at the press fittings is smaller than the inner diameter of the main body of the sleeve (700).

FIG. 9 and FIG. 10 also show additional details of the press fittings. FIG. 9 shows that the first press fitting (756) is opposed by a third press fitting (902). Similarly, FIG. 10 shows that the second press fitting (758) is opposed by a fourth press fitting (1002). Thus, in the example shown, the press fittings form circumferential press fittings, or additional ridges, that are disposed around only a portion of the circumference of the sleeve (700). In other examples, opposed pairs of press fittings in one or more examples are replaced by a single press fitting that is disposed more fully around the circumference of the sleeve (700), or entirely around the circumference of the sleeve (700).

Figure 15:
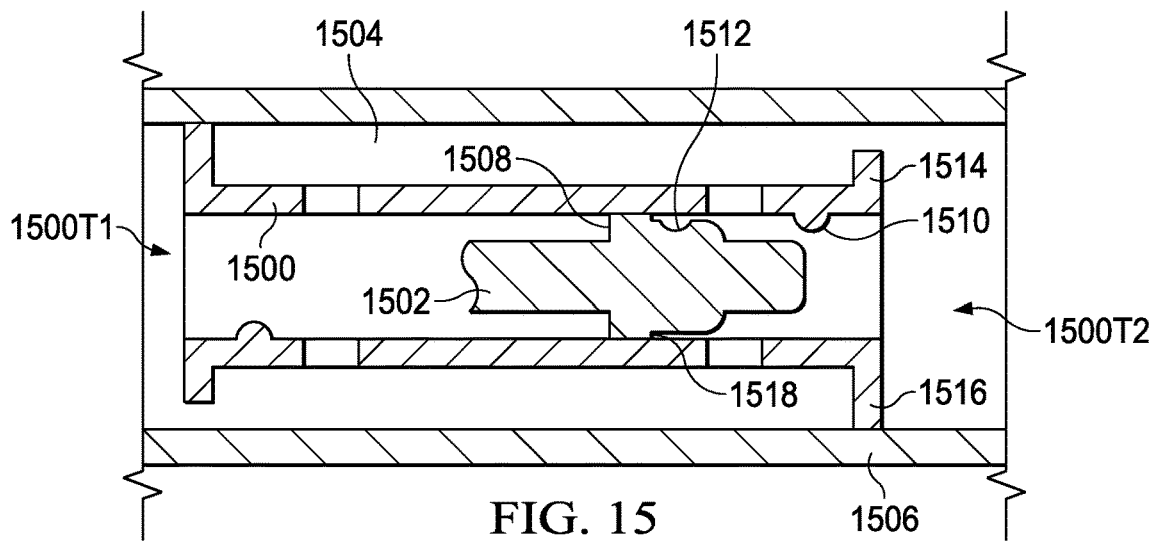
FIG. 15 shows a first phase of an operation of a collet, formed by the sleeve of the spool-sleeve assembly, in accordance with one or more examples.
Figure 16:
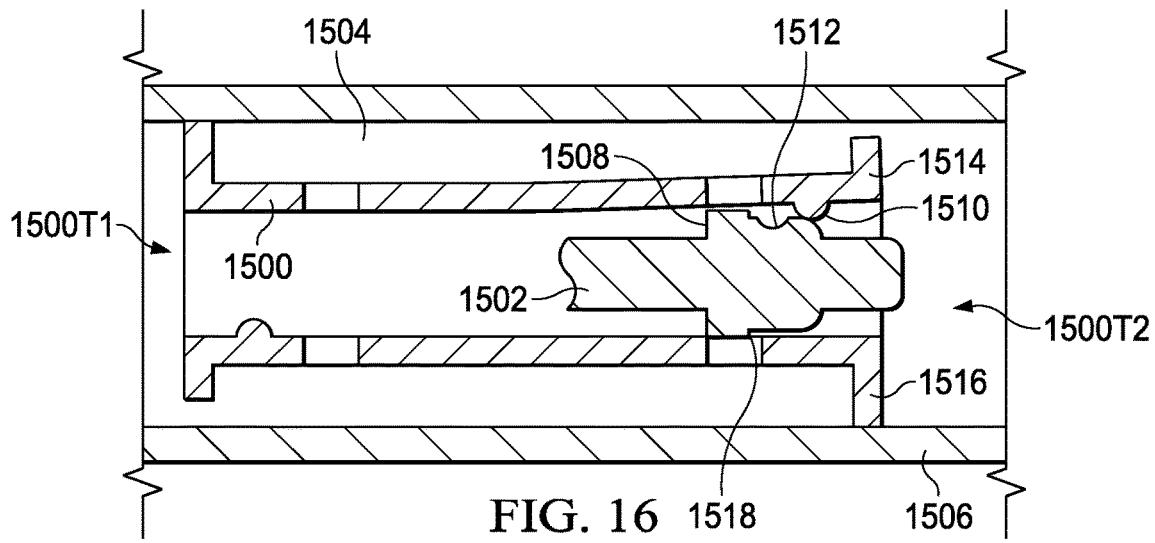
FIG. 16 shows a second phase of an operation of a collet, formed by the sleeve of the spool-sleeve assembly, in accordance with one or more examples.
Figure 17:
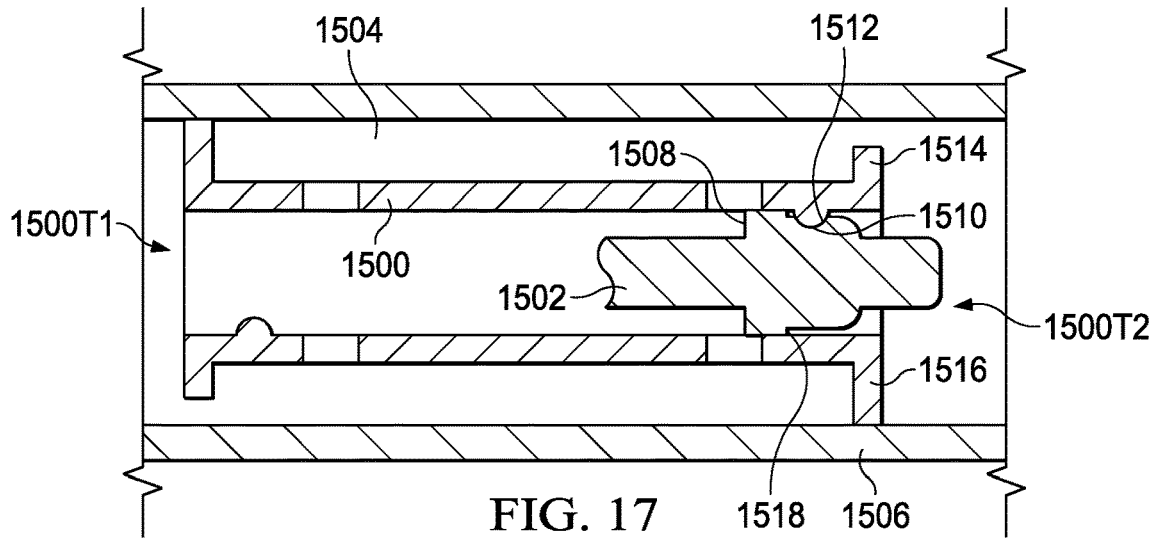
FIG. 17 shows a third phase of an operation of a collet, formed by the sleeve of the spool-sleeve assembly, in accordance with one or more examples.

FIG. 11 and FIG. 12 show the spool (702) in more detail, with FIG. 11 showing one example of the spool (702), and FIG. 12 showing a cross section of the spool (702). As seen in both figures, the first groove (760) is disposed in the first ridge (752) and the second groove (762) is disposed in the second ridge (754). FIG. 12 also shows that the first ridge (752) has a first outer diameter (1200) and the second ridge (754) has a second outer diameter (1202). As indicated above, the first outer diameter (1200) and the second outer diameter (1202) are greater than the second inner radius (900). In this manner, in order to slide back and forth between the first and second positions in the shuttle valve (600), the first ridge (752) and/or the second ridge (754) squeeze through the press fittings, expanding the collet formed by the sleeve (700). The press fittings then snap into the grooves, whereby the spool (702) is held in place until a threshold change fluid pressure is achieved to force the spool (702) back into the other position within the shuttle valve (600). This process is shown in FIG. 15 through FIG. 17.

As seen in FIG. 11 and FIG. 12, the third end (748) and the fourth end (750) in one or more examples are filleted; i.e., the ends are rounded. The rounded ends facilitate entry of the spool into the holes of the retaining seals shown in FIG. 13 and FIG. 14. The ends in one or more examples have different shapes, including chamfered, or a polygonal shape, or even a square shape with sharper edges in different examples. If desired, a first blind hole (1204) and a second blind hole (1206) in one or more examples are disposed axially into the ends of the spool (702), as shown in FIG. 12. Note, for purposes of reference below, that the third end (748) is defined by a third outer diameter (1208) and the fourth end (750) is defined by a fourth outer diameter (1210).

Figure 13:
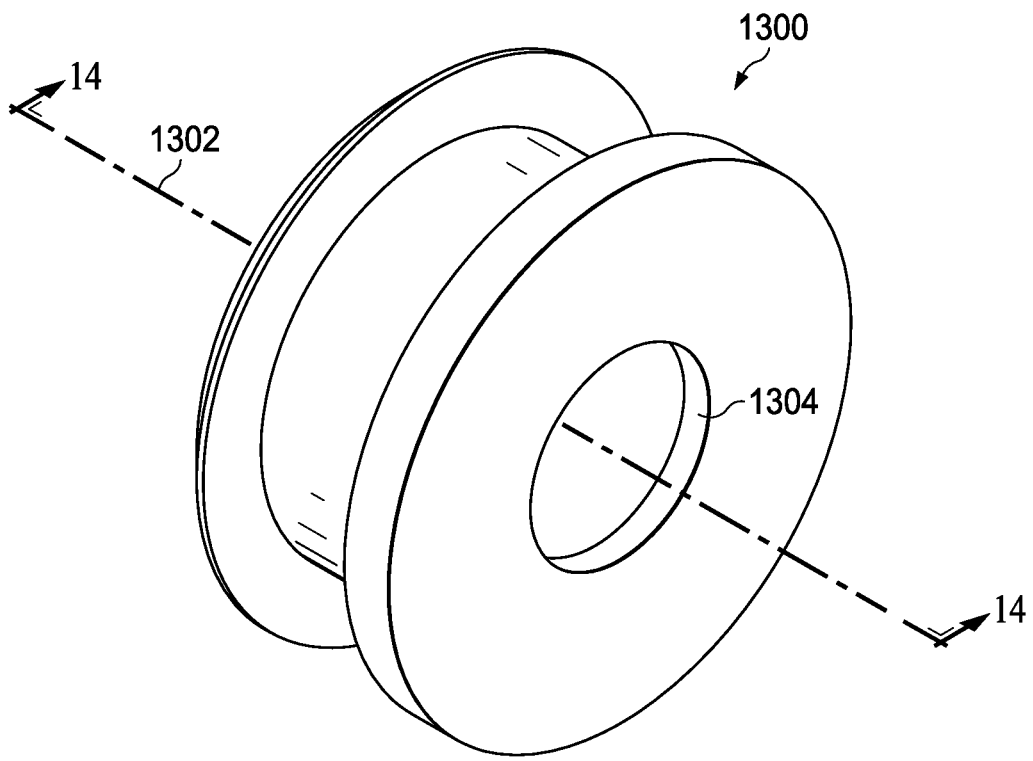
FIG. 13 shows a retaining seal, in accordance with one or more examples.
Figure 14:
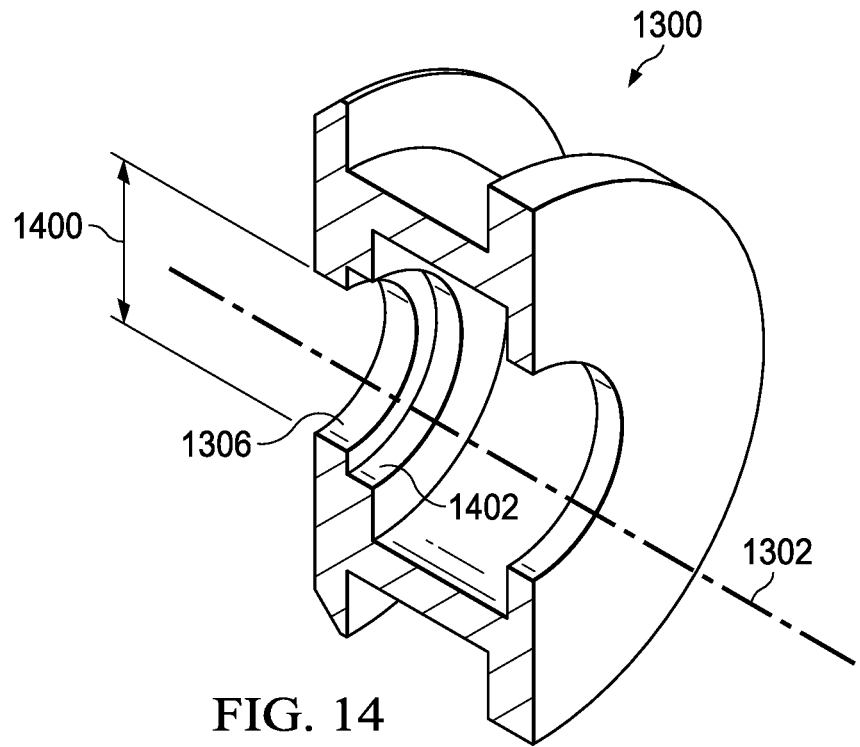
FIG. 14 shows a view of a retaining seal, in accordance with one or more examples.

FIG. 13 shows a retaining seal, in accordance with one or more examples. FIG. 14 shows a view of a retaining seal, in accordance with one or more examples. The retaining seal (1300) in one or more examples is the first retainer (616) or the second retainer (618) shown in FIG. 6. The retaining seal (1300) forms a hollow toroid, as shown in FIG. 13. The retaining seal (1300) includes two holes along a longitudinal axis (1302), first hole (1304) and second hole (1306). The first hole (1304) is sized and dimensioned to receive one of the third end (748) and the fourth end (750) of the spool (702).

In an example, a first interior seal radius (1400) of the first hole (1304) is defined along a radial direction relative to the longitudinal axis (1302). The first interior seal radius (1400) in one or more examples is equal to, or somewhat smaller than, one of the third outer diameter (1208) and/or the fourth outer diameter (1210) of the ends of the spool (702). In this manner, the ends of the spool (702) effectively plug the first hole (1304) when engaged into first hole (1304) of the retaining seal (1300). Thus, the spool (702) effectively will block fluid flow from one of the inlets of the sleeve (700).

A stop (1402) in one or more examples is provided at the other end of the retaining seal (1300) generally proximate the second hole (1306). The radial diameter of the stop (1402) is smaller than the third outer diameter (1208) and/or the fourth outer diameter (1210) of the ends of the spool (702). Thus, the stop (1402) constrains longitudinal movement of the spool (702) past the stop (1402).

FIG. 15 through FIG. 17 show the operation of the collet sleeve in use. FIG. 15 shows a first phase of an operation of a collet formed by the sleeve of the spool-sleeve assembly, in accordance with one or more examples. FIG. 16 shows a second phase of an operation of a collet formed by the sleeve of the spool-sleeve assembly, in accordance with one or more examples. FIG. 17 shows a third phase of an operation of a collet formed by the sleeve of the spool-sleeve assembly, in accordance with one or more examples. The sleeve (1500) and spool (1502) shown in FIG. 15 through FIG. 17, and various other related components, are as described with respect to FIG. 7 through FIG. 14. In one or more examples shown in FIG. 15 through FIG. 17, the sleeve (1500) is assumed to have multiple differently sized flange segments on both sides of the sleeve (1500), as shown in FIG. 7 and FIG. 8. Only part of the spool (1502) is shown, for clarity. FIG. 15 through FIG. 17 share common reference numerals referring to common objects.

In FIG. 15, the spool is in an initial position, not engaged at either side of the manifold chamber (1504) of the shuttle valve (see FIG. 6). Due to operation of the hydraulic system of which the shuttle valve is a part, first fluid pressure from the first inlet (1500T1) becomes greater than second fluid pressure from the second inlet (1500T2). As a result, the spool (1502) is urged longitudinally towards the second inlet (1500T2).

Eventually, as shown in FIG. 16, the ridge (1508) presses up against the press fitting (1510). Because the outer radius of the smaller flange segment (1514) is smaller than the inner radius of the manifold chamber (1506), the smaller flange segment (1514) is pressed radially outwardly, bending the sleeve (1500) outwardly as shown in FIG. 16. The force required to bend the smaller flange segment (1514) causes the sleeve (1500) to serve as a collet on the spool (1502).

Note that the outer radius of the larger flange segment (1516) is equal to the inner radius of the manifold chamber (1506). Thus, the force required to bend the smaller flange segment (1514), resulting in an opposing radial force on the end of the spool (1502), is balanced by the larger flange segment (1516) pressing against the inner wall of the manifold chamber (1506). In this manner, the smaller flange segment (1514) can bend radially outwardly, but the sleeve (1500) as a whole remains fixed in place within the manifold chamber (1506).

Next, as shown in FIG. 17, the press fitting (1510) in the spool (1502) snaps into groove (1512) in the ridge (1508) as the spool (1502) continues to move longitudinally through the sleeve (1500). However, at this point, the outer diameter of the ridge (1508) increases relative to the outer diameter of the ridge (1508) that is proximally closer to the end of the spool (1502), as shown at point (1518). Because the maximum fluid pressure difference expected to exist within the shuttle valve is known, the outer diameter of the ridge (1508) at the point (1518) is set so that the fluid pressure difference between the first inlet (1500T1) and the second inlet (1500T2) cannot continue to force the sleeve (1500) in the same longitudinal direction. In other words, the force exerted by the fluid pressure differential between first inlet (1500T1) and second inlet (1500T2) cannot exceed the force exerted by the collet imposed by a downward pressure of the smaller flange segment (1514) on the spool (1502).

For this reason, longitudinal progression of the spool (1502) within the sleeve (1500) is halted. Note that additional or different mechanisms in one or more examples are used to halt the longitudinal progression of the sleeve (1500), including a stop in a retainer, as shown in FIG. 14, a metal to metal contact between the end of the spool (1502) and an opposing end of the manifold chamber (1506), a post, or many other different possible mechanisms.

Note that the process described above in one or more examples is reversed. When during normal operation of the hydraulic system, the pressure differential between the second inlet (1500T2) and the first inlet (1500T1) becomes great enough, the force caused by the fluid pressure differential at the second inlet (1500T2) will overcome the collet force imposed by the press fitting (1510) resting inside the groove (1512). As a result, the spool will move longitudinally in the opposite direction, and eventually move into the second position to seal the first inlet (1500T1). Accordingly, the spool (1502) moves back and forth between the first and second positions within the shuttle valve, alternatingly blocking the first inlet (1500T1) and the second inlet (1500T2), depending on the relative fluid pressure in the two lines. This process is shown more fully in FIG. 18 through FIG. 20.

Figure 18:
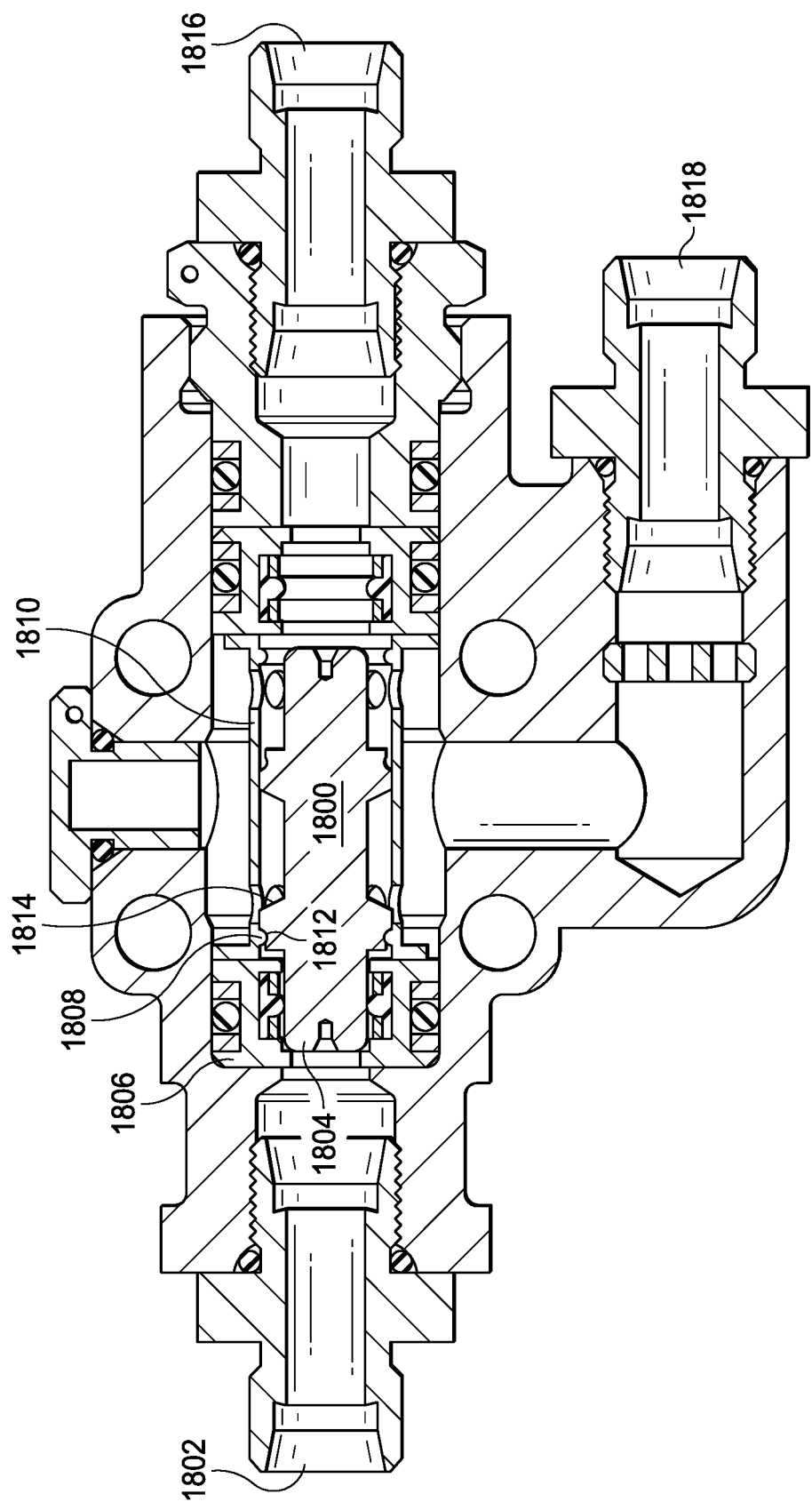
FIG. 18 shows a shuttle valve with the spool of a spool-sleeve assembly, in a first position, in accordance with one or more examples.
Figure 19:
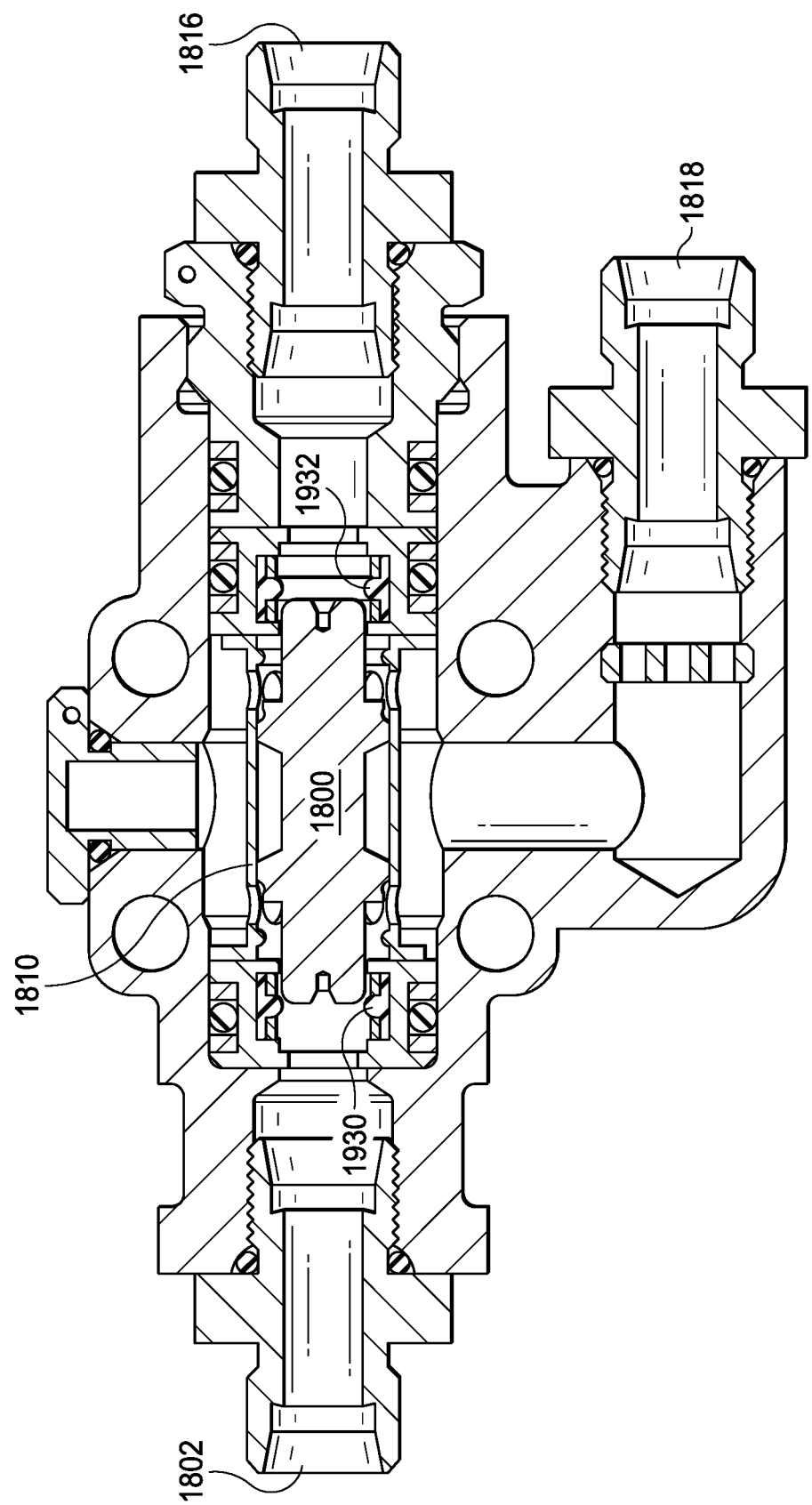
FIG. 19 shows a shuttle valve with the spool of a spool-sleeve assembly, in an intermediate position, in accordance with one or more examples.
Figure 20:
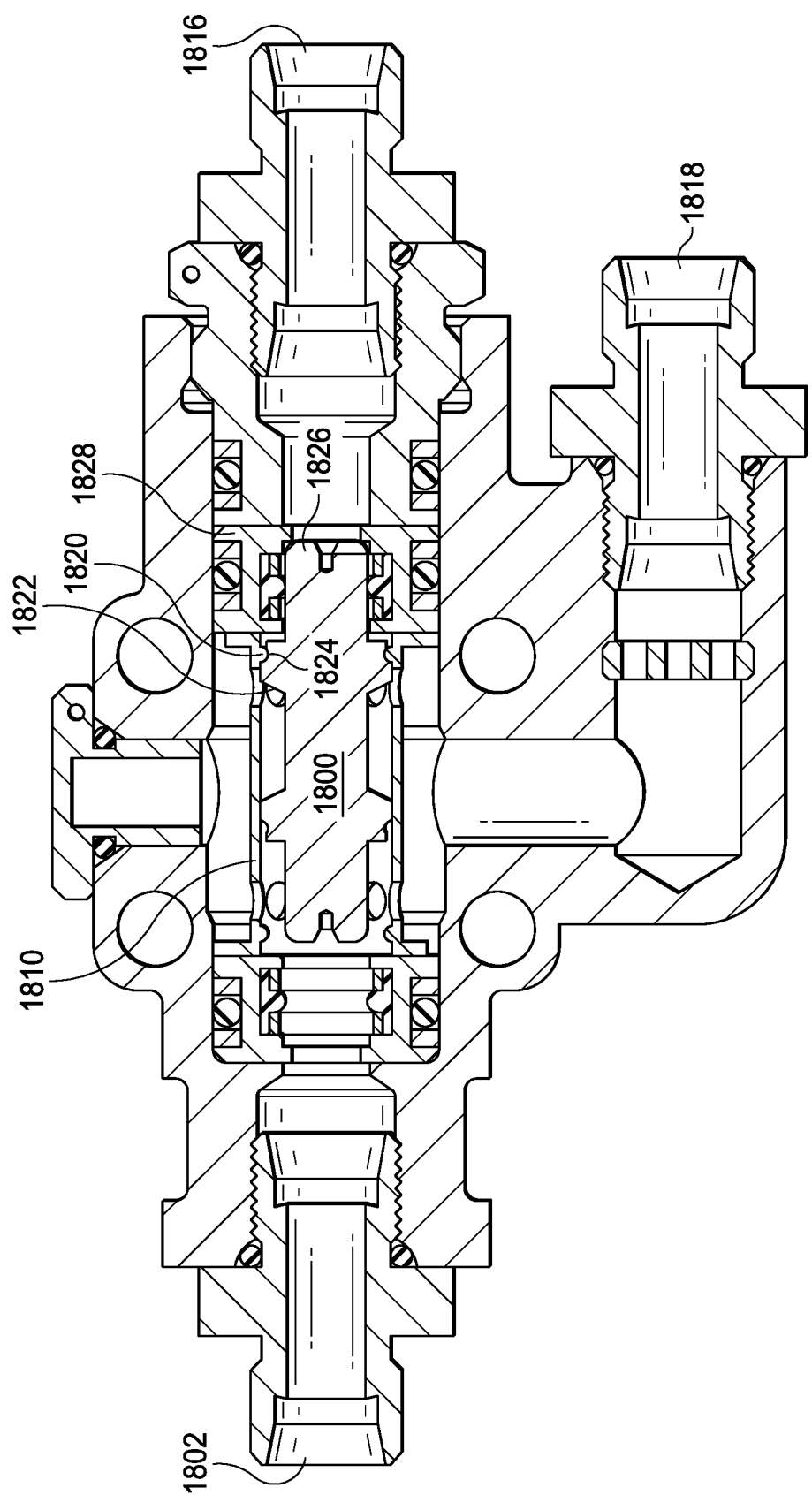
FIG. 20 shows a shuttle valve with the spool of a spool-sleeve assembly, in a second position, in accordance with one or more examples.

FIG. 18 shows a shuttle valve with the spool of a spool-sleeve assembly, in a first position, in accordance with one or more examples. FIG. 19 shows a shuttle valve with the spool of a spool-sleeve assembly, in an intermediate position, in accordance with one or more examples. FIG. 20 shows a shuttle valve with the spool of a spool-sleeve assembly, in a second position, in accordance with one or more examples. FIG. 18 through FIG. 20 should be considered together, and use common reference numerals referring to common objects. The various components shown in FIG. 18 through FIG. 20 are similar to corresponding similarly named objects in FIG. 6 through FIG. 17.

In FIG. 18 the spool (1800) is in a first position. In the first position, the spool (1800) blocks a first inlet (1802), because a third end (1804) of the spool (1800) is engaged in a first retaining seal (1806). The spool (1800) is held in place via the collet action of the first press fitting (1808) of the sleeve (1810) pressing into the first groove (1812) of the first ridge (1814) of the spool (1800). As a result, fluid flows from the second inlet (1816) into an outlet (1818).

In FIG. 19 the spool (1800) is in an intermediate position. At this point, a first fluid pressure at the first inlet (1802) is greater than a second fluid pressure at the second inlet (1816) by more than a threshold amount. As a result, the collet force applied by the sleeve (1810) against the spool (1800) is overcome, and the spool (1800) is forced to slide longitudinally towards the second inlet (1816). During this time, fluid briefly flows from both the first inlet (1802) and the second inlet (1816) towards the outlet (1818). However, the operational movement of the spool (1800) shown in FIG. 18 through FIG. 20 takes place very quickly; e.g., smaller than a second, so practically very little fluid flows from both outlets towards the outlet (1818).

In FIG. 20 the spool (1800) is in a second position. At this point, the first fluid pressure differential between the first inlet (1802) and the second inlet (1816) is greater than the collet pressure exerted by the third press fitting (1820) against the second ridge (1822). As a result, at least one outer flange of the sleeve (1810) expands radially outwardly, as shown in FIG. 16, and the third press fitting (1820) will snap into the second groove (1824) of the second ridge (1822) of the spool (1800), holding the spool (1800) in place. Additionally, the fourth end (1826) of the spool (1800) engages inside a second seal (1828). As a result, the second inlet (1816) is plugged, and fluid flows only between the first inlet (1802) and the outlet (1818).

Note that additional components in one or more examples are present. Referring to FIG. 19, inner ring seals, such as a first inner ring seal (1930) and a second inner ring seal (1932), in one or more examples are present inside the first retaining seal (1806) and the second seal (1828), respectively. The inner ring seals act as redundant seals, and/or further block the respective one of the first inlet (1802) or the second inlet (1816). Yet other components in one or more examples are present.

Figure 21:
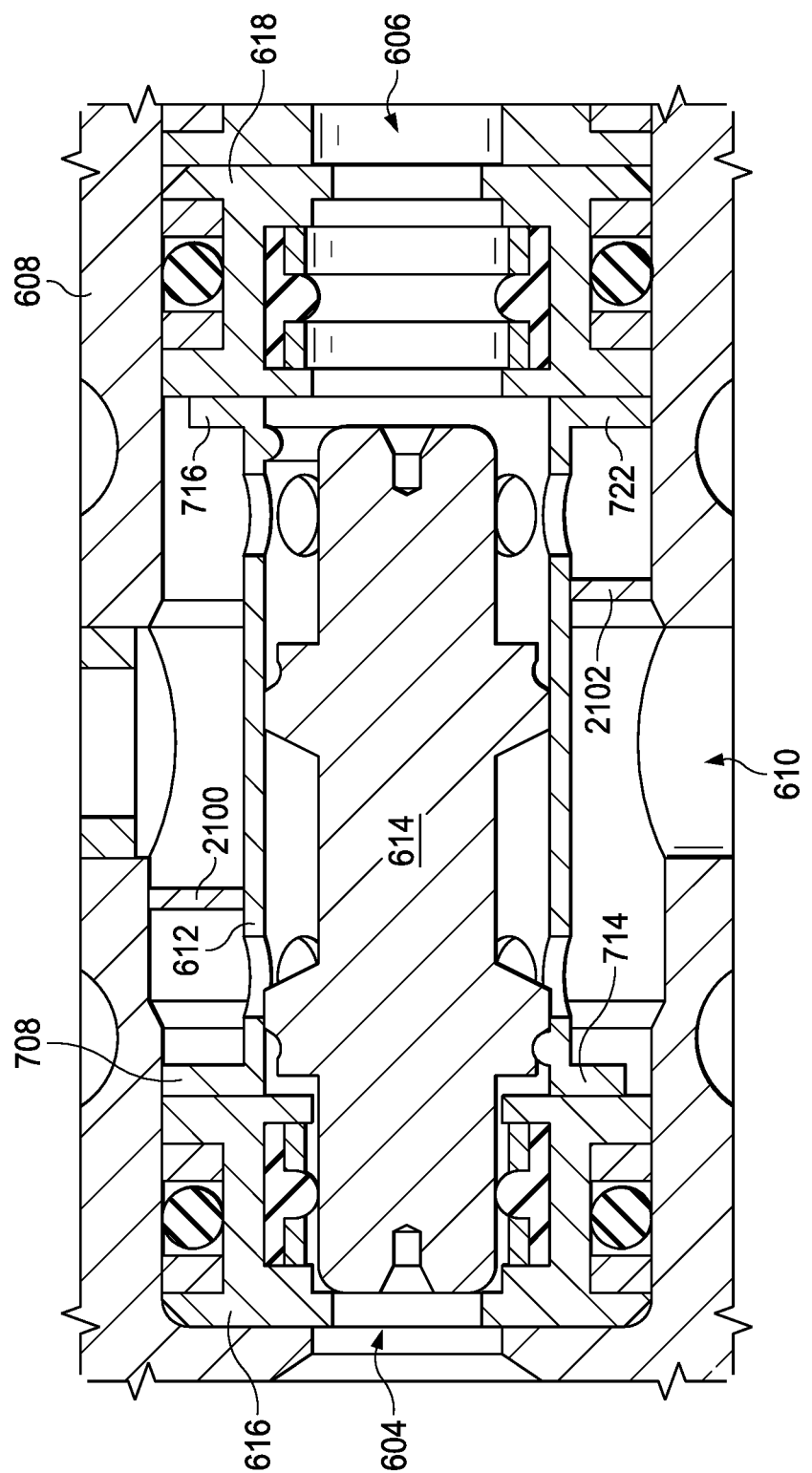
FIG. 21 shows an alternative sleeve design of a spool-sleeve assembly, in a second position, in accordance with one or more examples.

FIG. 21 shows an alternative sleeve design of a spool-sleeve assembly, in a second position, in accordance with one or more examples. FIG. 21 is similar to the example shown in FIG. 6 through FIG. 8, and thus shares some common reference numerals. Accordingly, first inlet (604), second inlet (606), manifold chamber (608), outlet (610), sleeve (612), spool (614), first retainer (616), and second retainer (618) are shown for reference from FIG. 6. Additionally, first flange (708), fourth flange (714), fifth flange (716), and eighth flange (722) are shown for reference from FIG. 8. The relationships and functions of these components are described with respect to FIG. 6 through FIG. 20.

In the example shown in FIG. 7 and FIG. 8, the different flange segments were of different sizes. Thus, for example, the first flange (708) has a larger outer radius than the fourth flange (714), and likewise the eighth flange (722) has a larger outer radius than the fifth flange (716). However, in the example shown in FIG. 21, the various flanges on either end of the sleeve (612) are either equivalent, or are all at least smaller than the inner radius of the inner wall of the manifold chamber (608). In this manner, opposing flanges at the edges of the sleeve (612) both move radially outwardly as the ridges of the spool (614) move past the press fittings.

However, in this example, the sleeve (612) is supported within the second retainer (618) via one or more retaining collars, such as first retaining collar (2100) and second retaining collar (2102). Each collar is a partially circular post that connects the inner wall of the manifold chamber (608) to the outer wall of the sleeve (612). Although two retaining collars are shown, one on either side of the sleeve (612) within the manifold chamber (608), only one retaining collar in one or more examples is present, or additional retaining collars in one or more examples are present. The retaining collars in one or more examples take the form of fully circumferential wedges, thereby forming toroids within the second retainer (618), or in one or more examples are only partially circumferential round the sleeve (612). The retaining collars in one or more examples are replaced with posts or pegs. Thus, the examples shown in FIG. 21 do not necessarily limit other possible examples.

Also provided are the following illustrative, non-exhaustive examples of the subject matter encompassed herein, which relate to:

A spool-sleeve assembly (300), comprising: a sleeve (302), comprising a first end (304, 704), a second end (306, 706), and a first inner radius (310); a first flange (312), outwardly extending from the first end (304, 704) of the sleeve (302), wherein the first flange (312) comprises a first slit (318) that separates the first flange (312) into a first plurality of flange segments (707); a second flange (324), outwardly extending from the second end (306, 706) of the sleeve (302), wherein the second flange (324) comprises a second slit (330) that separates the second flange (324) into a second plurality of flanges (717); a first press fitting (336), extending inwardly from on a first inner wall (308) of the sleeve (302) proximate the first end (304, 704) and the first slit (318), wherein the sleeve (302) has a second inner radius (338) at the first press fitting (336), and wherein the second inner radius (338) is smaller than the first inner radius (310); a second press fitting (340, 758), extending inwardly from the first inner wall (308) of the sleeve (302) proximate the second end (306, 706) and the second slit (330), wherein the sleeve (302) has a third inner radius (342) at the second press fitting (340), and wherein the third inner radius (342) is smaller than the first inner radius (310); a first hole (344), fully penetrating the sleeve (302) between the first flange (312) and the second flange (324); a spool (348, 702), slidable inside the sleeve (302), having a third end (350, 748) and a fourth end (352, 750); a first ridge (358, 752), outwardly extending from the spool (348, 702) proximate the third end (350, 748) and comprising a first groove (362, 760) and a first outer diameter (360, 1200), which is greater than the second inner radius (338) of the sleeve (302); and a second ridge (364, 754), outwardly extending from the spool (348, 702) proximate the fourth end (352, 750) and comprising a second groove (368, 762) and a second outer diameter (366, 1202), which greater than the third inner radius (342) of the sleeve (302), wherein: the first press fitting (336) is sized and dimensioned so that at least a first portion of the first press fitting (336) fits in the first groove (362, 760) of the first ridge (358, 752); and the second press fitting (340) is sized and dimensioned so that at least a second portion of the second press fitting (340) fits in the second groove (368, 762) of the second ridge (364, 754).

The spool-sleeve assembly (300) described in the immediately preceding paragraph, wherein: the first plurality of flange segments (707) comprises at least a first flange segment (314) and a second flange segment (316), and the first flange segment (314) has a first flange outer radius (320) that is greater than a second flange outer radius of the second flange segment (316).

The spool-sleeve assembly (300) described in the immediately preceding paragraph, wherein: the second plurality of flanges (717) comprises at least a fifth flange (716) and a sixth flange (718), the fifth flange (716) has a fifth flange outer radius, which is greater than a sixth flange outer radius of the sixth flange (718), and the fifth flange outer radius is equal to the first flange outer radius (320).

The spool-sleeve assembly (300) described in any one of the three immediately preceding paragraphs, further comprising a first seal (372), located at the first end (304, 704) of the sleeve (302), and configured to receive the third end (350, 748) of the spool (348, 702).

The spool-sleeve assembly (300) described in the immediately preceding paragraph, wherein: the first seal (372) comprises a first orifice (374) that receives the third end (350, 748) of the spool (348, 702); the first orifice (374) has a first radius (376) that is equal to a third outer diameter (354) of the third end (350, 748); and the first radius (376) of the first orifice (374) is smaller than the first outer diameter (360, 1200) of the first ridge (358, 752).

The spool-sleeve assembly (300) described in the immediately preceding paragraph, wherein: the first seal (372) further comprises a first retainer (378, 616), located opposite the first orifice (374); and the first retainer (378, 616) is sized and dimensioned to retain the third end (350, 748) of the spool (348, 702).

The spool-sleeve assembly (300) described in the immediately preceding paragraph, wherein the first seal (372) further comprises a first interior seal (380), having a first interior seal radius (382, 1400) equal to the third outer diameter (354) of the third end (350, 748) of the spool (348, 702).

The spool-sleeve assembly (300) described in the immediately preceding paragraph, further comprising a second seal (384, 1828), located at the second end (306, 706) of the sleeve (302) and configured to receive the fourth end (352, 750) of the spool (348, 702), wherein: the second seal (384, 1828) comprises a second orifice (386) that receives the fourth end (352, 750) of the spool (348, 702), the second orifice (386) has a second radius (388), which is equal to a fourth outer diameter (356, 1210) of the fourth end (352, 750), the second radius (388) of the second orifice (386) is also smaller than the third inner radius (342) of the second ridge (364, 754), the second seal (384, 1828) further comprises a second retainer (390, 618), located opposite the second orifice (386) and sized and dimensioned to retain the fourth end (352, 750) of the spool (348, 702), and the second seal (384, 1828) further comprises a second interior seal (392), having a second interior seal radius (394), which is equal to the fourth outer diameter (356, 1210) of the fourth end (352, 750) of the spool (348, 702).

The spool-sleeve assembly (300) described in any one of the eight immediately preceding paragraphs, further comprising first holes (346), arranged radially around the sleeve (302).

The spool-sleeve assembly (300) described in the immediately preceding paragraph, further comprising second holes (398), arranged radially around the sleeve (302), distally of the second flange (324).

The spool-sleeve assembly (300) described in the immediately preceding paragraph, wherein: the first slit (318) also penetrates the first flange (312) to one of the first holes (346), and the second slit (330) also penetrates the second flange (324) to one of the second holes (398).

The spool-sleeve assembly (300) described in any one of the eleven immediately preceding paragraphs, wherein: the sleeve (302) of the sleeve (302) is cylindrical, the first press fitting (336) is arranged radially around the first inner wall (308) of the sleeve (302), and the second press fitting (340, 758) is arranged radially around the first inner wall (308) of the sleeve (302).

The spool-sleeve assembly (300) described in the immediately preceding paragraph, wherein: the spool (348, 702) is cylindrical, the first ridge (358, 752) extends radially from the spool (348, 702), and the second ridge (364, 754) extends radially from the spool (348, 702).

The spool-sleeve assembly (300) described in the immediately preceding paragraph, wherein: the first groove (362, 760) is a radial groove, located in the first ridge (358, 752); and the second groove (368, 762) is a radial groove, located in the second ridge (364, 754).

The spool-sleeve assembly (300) described in any one of the fourteen immediately preceding paragraphs, wherein: the third end (350, 748) of the spool (348, 702) is either filleted or chamfered; and the fourth end (352, 750) of the spool (348, 702) is either filleted or chamfered.

An aircraft comprising: a fuselage (102); a first hydraulic braking system (114), connected to the fuselage (102); and a shuttle valve (200, 600), operably connected to the first hydraulic braking system (114), the shuttle valve (200, 600) comprising: a first inlet (604); a manifold chamber (608) in fluidic communication with the first inlet (604); a second inlet (606) in fluidic communication with the manifold chamber (608); an outlet (610) in fluidic communication with the manifold chamber (608); and a spool-sleeve assembly (300), positioned inside the manifold chamber (608) and comprising: a sleeve (302), comprising a first end (304, 704), a second end (306, 706), a first inner radius (310), a second inner radius (338), and a third inner radius (342); a spool (348, 702), slidably located inside the sleeve (302) and comprising a third end (350, 748) and a fourth end (352, 750); a first flange (312), integrally formed with the sleeve (302) and outwardly extending from the first end (304, 704) of the sleeve (302); a second flange (324), integrally formed with the sleeve (302) and outwardly extending from the second end (306, 706) of the sleeve (302); a first press fitting (336), located on a first inner wall (308) of the sleeve (302); a second press fitting (340), located on the first inner wall (308) of the sleeve (302); a first hole (344), located through the sleeve (302) between the first flange (312) and the second flange (324); a first ridge (358, 752), outwardly extending from the spool (348, 702) proximate the third end (350, 748) of the spool (348, 702); and a second ridge (364, 754), outwardly extending from the spool (348, 702) proximate the fourth end (352, 750) of the spool (348, 702), wherein: the first flange (312) is segmented into a first plurality of flange segments (707) via a first slit (318), located in the first flange (312); the second flange (324) is segmented into a second plurality of flanges (717) via a second slit (330), located in the second flange (324); the first press fitting (336) is inwardly located on the first inner wall (308) of the sleeve (302) proximate the first end (304, 704) and the first slit (318); the second inner radius (338) of the sleeve (302) is at the first press fitting (336); the second inner radius (338) of the sleeve (302) is smaller than the first inner radius (310) of the sleeve (302); the second press fitting (340) is inwardly located on the first inner wall (308) of the sleeve proximate the second end (306, 706) and the second slit (330); the third inner radius (342) of the sleeve (302) is at the second press fitting (340); the third inner radius (342) of the sleeve (302) is smaller than the first inner radius (310); the third end (350, 748) is sized and dimensioned to block the first inlet (604) and the fourth end (352, 750) is sized and dimensioned to block the second inlet (606); the first ridge (358, 752) comprises a first outer diameter (360, 1200), which is greater than the second inner radius (338) of the sleeve (302), and a first groove (362, 760), located in the first ridge (358, 752); the second ridge (364, 754) comprises a second outer diameter (366, 1202), which is greater than the third inner radius (342) of the sleeve (302), and a second groove (368, 762), located in the second ridge (364, 754);

the first press fitting (336) is sized and dimensioned so that at least a first portion of the first press fitting (336) fits in the first groove (362, 760); and the second press fitting (340) is sized and dimensioned so that at least a second portion of the second press fitting (340) fits in the second groove (368, 762).

The aircraft described in the immediately preceding paragraph, wherein: the first plurality of flange segments (707) comprises at least a first flange segment (314) and a second flange segment (316), and the first flange segment (314) has a first flange outer radius (320) that is greater than a second flange outer radius of the second flange segment (316).

The aircraft described in the immediately preceding paragraph, wherein: the second plurality of flanges (717) comprises at least a fifth flange (716) and a sixth flange (718), the fifth flange (716) has a fifth flange outer radius, which is greater than a sixth flange outer radius of the sixth flange (718), and the fifth flange outer radius is equal to the first flange outer radius (320).

The aircraft described in any of the three immediately preceding paragraphs, further comprising a first seal (372), located at the first end (304, 704) of the sleeve (302), the first seal (372) configured to receive the third end (350, 748) of the spool (348, 702), wherein: the first seal (372) comprises a first orifice (374) that receives the third end (350, 748) of the spool (348, 702); the first orifice (374) has a first radius (376) that is equal to a third outer diameter (354) of the third end (350, 748); and the first radius (376) of the first orifice (374) is smaller than the first outer diameter (360, 1200) of the first ridge (358, 752).

A shuttle valve (200, 600), comprising: a first inlet (604); a manifold chamber (608) in fluidic communication with the first inlet (604); a second inlet (606) in fluidic communication with the manifold chamber (608); an outlet (610) in fluidic communication with the manifold chamber (608); and a spool-sleeve assembly (300), positioned inside the manifold chamber (608) and comprising: a sleeve (302), comprising a first end (304, 704), a second end (306, 706), a first inner radius (310), a second inner radius (338), and a third inner radius (342); a spool (348, 702), slidably located inside the sleeve (302) and comprising a third end (350, 748) and a fourth end (352, 750); a first flange (312), integrally formed with the sleeve (302) and outwardly extending from the first end (304, 704) of the sleeve (302); a second flange (324), integrally formed with the sleeve (302) and outwardly extending from the second end (306, 706) of the sleeve (302); a first press fitting (336), located on a first inner wall (308) of the sleeve (302); a second press fitting (340), located on the first inner wall (308) of the sleeve (302); a first hole (344), located through the sleeve (302) between the first flange (312) and the second flange (324); a first ridge (358, 752), outwardly extending from the spool (348, 702) proximate the third end (350, 748) of the spool (348, 702); and a second ridge (364, 754), outwardly extending from the spool (348, 702) proximate the fourth end (352, 750) of the spool (348, 702), wherein: the first flange (312) is segmented into a first plurality of flange segments (707) via a first slit (318), located in the first flange (312); the second flange (324) is segmented into a second plurality of flanges (717) via a second slit (330), located in the second flange (324); the first press fitting (336) is inwardly located on the first inner wall (308) of the sleeve (302) proximate the first end (304, 704) and the first slit (318); the second inner radius (338) of the sleeve (302) is at the first press fitting (336); the second inner radius (338) of the sleeve (302) is smaller than the first inner radius (310) of the sleeve (302); the second press fitting (340) is inwardly located on the first inner wall (308) of the sleeve proximate the second end (306, 706) and the second slit (330); the third inner radius (342) of the sleeve (302) is at the second press fitting (340); the third inner radius (342) of the sleeve (302) is smaller than the first inner radius (310); the third end (350, 748) is sized and dimensioned to block the first inlet (604) and the fourth end (352, 750) is sized and dimensioned to block the second inlet (606); the first ridge (358, 752) comprises a first outer diameter (360, 1200), which is greater than the second inner radius (338) of the sleeve (302), and a first groove (362, 760), located in the first ridge (358, 752); the second ridge (364, 754) comprises a second outer diameter (366, 1202), which is greater than the third inner radius (342) of the sleeve (302), and a second groove (368, 762), located in the second ridge (364, 754); the first press fitting (336) is sized and dimensioned so that at least a first portion of the first press fitting (336) fits in the first groove (362, 760); and the second press fitting (340) is sized and dimensioned so that at least a second portion of the second press fitting (340) fits in the second groove (368, 762).

Figure 22:
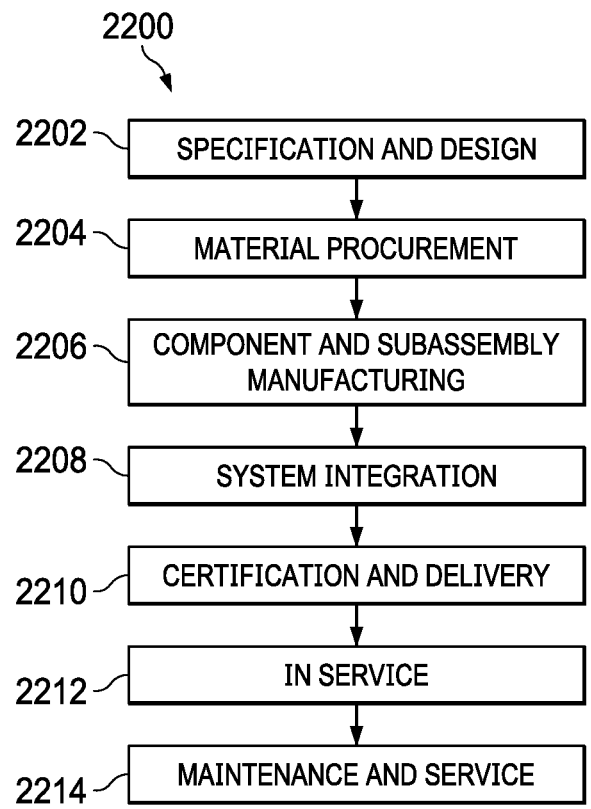
FIG. 22 shows a flowchart of a method for manufacturing and maintenance, in a second position, in accordance with one or more examples.
Figure 23:
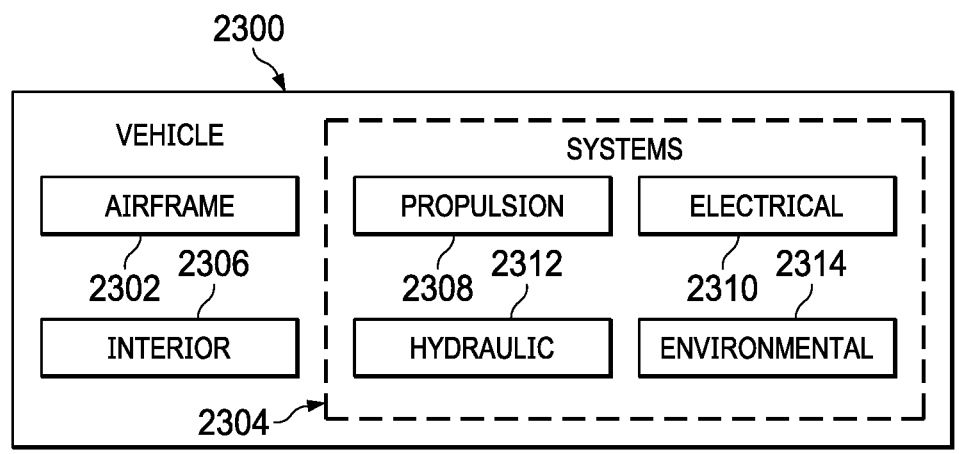
FIG. 23 shows a block diagram of an aircraft, in a second position, in accordance with one or more examples.

FIG. 22 shows a flowchart of a method for manufacturing and maintenance, in a second position, in accordance with one or more examples. FIG. 23 shows a block diagram of an aircraft, in a second position, in accordance with one or more examples.

Turning to FIG. 22, during pre-production, the exemplary aircraft manufacturing and service method (2200) includes a specification and design (2202) of the aircraft (2300) in FIG. 23 and a material procurement (2204) for the aircraft (2300). During production, the component and subassembly manufacturing (2206) and system integration (2208) of the aircraft (2300) in FIG. 23 takes place. Thereafter, the aircraft (2300) in FIG. 23 in one or more examples go through certification and delivery (2210) in order to be placed in service (2212). While in service by a customer, the aircraft (2300) in FIG. 23 is scheduled for routine maintenance and service (2214), which in one or more examples are includes modification, reconfiguration, refurbishment, and other maintenance or service.

Each of the processes of the aircraft manufacturing and service method (2200) in one or more examples is performed or carried out by a system integrator, a third party, and/or an operator. The operator in one or more examples is a customer. For the purposes of this description, a system integrator in one or more examples includes, without limitation, any number of aircraft manufacturers and major-system subcontractors; a third party in one or more examples includes, without limitation, any number of vendors, subcontractors, and suppliers; and an operator in one or more examples is an airline, leasing company, military entity, service organization, and so on.

With reference now to FIG. 23, an illustration of an aircraft (2300) is depicted in which an advantageous example in one or more examples is implemented. In this example, the aircraft (2300) is produced by the aircraft manufacturing and service method (2200) in FIG. 22. The aircraft (2300) in one or more examples includes airframe (2302) with systems (2304) and an interior (2306). Examples of systems (2304) include one or more of a propulsion system (2308), an electrical system (2310), a hydraulic system (2312), and an environmental system (2314). Any number of other systems in one or more examples are included.

Although an aerospace example is shown, different advantageous examples in one or more examples are applied to other industries, such as the automotive industry. Thus, for example, the aircraft (2300) in one or more examples is replaced by an automobile or other vehicle or object in one or more examples.

The apparatus and methods embodied herein in one or more examples are employed during any one or more of the stages of the aircraft manufacturing and service method (2200) in FIG. 22. For example, components or subassemblies produced in the component and subassembly manufacturing (2206) in FIG. 22 in one or more examples are fabricated or manufactured in a manner similar to components or subassemblies produced while the aircraft (2300) is in service (2212) in FIG. 22.

Also, one or more apparatus examples, method examples, or a combination thereof in one or more examples are utilized during production stages, such as the component and subassembly manufacturing (2206) and system integration (2208) in FIG. 22, for example, by expediting the assembly of or reducing the cost of the aircraft (2300). Similarly, one or more of apparatus examples, method examples, or a combination thereof in one or more examples are utilized while the aircraft (2300) is in service (2212) or during maintenance and service (2214) in FIG. 22.

For example, one or more of the advantageous examples are applied during component and subassembly manufacturing (2206) to rework inconsistencies that in one or more examples are found in composite structures. One or more advantageous examples are implemented during maintenance and service (2214) to remove or mitigate inconsistencies that are identified. Thus, one or more examples described with respect to FIG. 1 through FIG. 9 in one or more examples are implemented during component and subassembly manufacturing (2206) and/or during maintenance and service (2214) to remove or mitigate inconsistencies that are identified.

While one or more examples have been described with respect to a limited number of examples, those skilled in the art, having benefit of this disclosure, will appreciate that other examples can be devised which do not depart from the scope as disclosed herein. Accordingly, the scope should be limited only by the attached claims.

What is claimed is:

1. A spool-sleeve assembly (300), comprising:
    a sleeve (302), comprising a first end (304, 704), a second end (306, 706), and a first inner radius (310);
    a first flange (312), outwardly extending from the first end (304, 704) of the sleeve (302), wherein the first flange (312) comprises a first slit (318) that separates the first flange (312) into a first plurality of flange segments (707);
    a second flange (324), outwardly extending from the second end (306, 706) of the sleeve (302), wherein the second flange (324) comprises a second slit (330) that separates the second flange (324) into a second plurality of flanges (717);
    a first press fitting (336), extending inwardly from on a first inner wall (308) of the sleeve (302) proximate the first end (304, 704) and the first slit (318), wherein the sleeve (302) has a second inner radius (338) at the first press fitting (336), and wherein the second inner radius (338) is smaller than the first inner radius (310);
    a second press fitting (340, 758), extending inwardly from the first inner wall (308) of the sleeve (302) proximate the second end (306, 706) and the second slit (330), wherein the sleeve (302) has a third inner radius (342) at the second press fitting (340), and wherein the third inner radius (342) is smaller than the first inner radius (310);
    a first hole (344), fully penetrating the sleeve (302) between the first flange (312) and the second flange (324);
    a spool (348, 702), slidable inside the sleeve (302), having a third end (350, 748) and a fourth end (352, 750);
    a first ridge (358, 752), outwardly extending from the spool (348, 702) proximate the third end (350, 748) and comprising a first groove (362, 760) and a first outer diameter (360, 1200), which is greater than the second inner radius (338) of the sleeve (302); and
    a second ridge (364, 754), outwardly extending from the spool (348, 702) proximate the fourth end (352, 750) and comprising a second groove (368, 762) and a second outer diameter (366, 1202), which greater than the third inner radius (342) of the sleeve (302),
    wherein:
        the first press fitting (336) is sized and dimensioned so that at least a first portion of the first press fitting (336) fits in the first groove (362, 760) of the first ridge (358, 752); and
        the second press fitting (340) is sized and dimensioned so that at least a second portion of the second press fitting (340) fits in the second groove (368, 762) of the second ridge (364, 754).

2. The spool-sleeve assembly (300) of claim 1, wherein:
    the first plurality of flange segments (707) comprises at least a first flange segment (314) and a second flange segment (316), and
    the first flange segment (314) has a first flange outer radius (320) that is greater than a second flange outer radius of the second flange segment (316).

3. The spool-sleeve assembly (300) of claim 2, wherein:
    the second plurality of flanges (717) comprises at least a fifth flange (716) and a sixth flange (718),
    the fifth flange (716) has a fifth flange outer radius, which is greater than a sixth flange outer radius of the sixth flange (718), and
    the fifth flange outer radius is equal to the first flange outer radius (320).

4. The spool-sleeve assembly (300) of claim 1, further comprising a first seal (372), located at the first end (304, 704) of the sleeve (302), and configured to receive the third end (350, 748) of the spool (348, 702).

5. The spool-sleeve assembly (300) of claim 4, wherein:
    the first seal (372) comprises a first orifice (374) that receives the third end (350, 748) of the spool (348, 702);
    the first orifice (374) has a first radius (376) that is equal to a third outer diameter (354) of the third end (350, 748); and
    the first radius (376) of the first orifice (374) is smaller than the first outer diameter (360, 1200) of the first ridge (358, 752).

6. The spool-sleeve assembly (300) of claim 5, wherein:
    the first seal (372) further comprises a first retainer (378, 616), located opposite the first orifice (374); and
    the first retainer (378, 616) is sized and dimensioned to retain the third end (350, 748) of the spool (348, 702).

7. The spool-sleeve assembly (300) of claim 6, wherein the first seal (372) further comprises a first interior seal (380), having a first interior seal radius (382, 1400) equal to the third outer diameter (354) of the third end (350, 748) of the spool (348, 702).

8. The spool-sleeve assembly (300) of claim 7, further comprising a second seal (384, 1828), located at the second end (306, 706) of the sleeve (302) and configured to receive the fourth end (352, 750) of the spool (348, 702), wherein:
the second seal (384, 1828) comprises a second orifice (386) that receives the fourth end (352, 750) of the spool (348, 702),
the second orifice (386) has a second radius (388), which is equal to a fourth outer diameter (356, 1210) of the fourth end (352, 750),
the second radius (388) of the second orifice (386) is also smaller than the third inner radius (342) of the second ridge (364, 754),
the second seal (384, 1828) further comprises a second retainer (390, 618), located opposite the second orifice (386) and sized and dimensioned to retain the fourth end (352, 750) of the spool (348, 702), and
the second seal (384, 1828) further comprises a second interior seal (392), having a second interior seal radius (394), which is equal to the fourth outer diameter (356, 1210) of the fourth end (352, 750) of the spool (348, 702).

9. The spool-sleeve assembly (300) of claim 1, further comprising first holes (346), arranged radially around the sleeve (302).

10. The spool-sleeve assembly (300) of claim 9, further comprising second holes (398), arranged radially around the sleeve (302), distally of the second flange (324).

11. The spool-sleeve assembly (300) of claim 10, wherein:
the first slit (318) also penetrates the first flange (312) to one of the first holes (346), and
the second slit (330) also penetrates the second flange (324) to one of the second holes (398).

12. The spool-sleeve assembly (300) of claim 1, wherein:
the sleeve (302) of the sleeve (302) is cylindrical,
the first press fitting (336) is arranged radially around the first inner wall (308) of the sleeve (302), and
the second press fitting (340, 758) is arranged radially around the first inner wall (308) of the sleeve (302).

13. The spool-sleeve assembly (300) of claim 12, wherein:
the spool (348, 702) is cylindrical,
the first ridge (358, 752) extends radially from the spool (348, 702), and
the second ridge (364, 754) extends radially from the spool (348, 702).

14. The spool-sleeve assembly (300) of claim 13, wherein:
the first groove (362, 760) is a radial groove, located in the first ridge (358, 752); and
the second groove (368, 762) is a radial groove, located in the second ridge (364, 754).

15. The spool-sleeve assembly (300) of claim 1, wherein:
the third end (350, 748) of the spool (348, 702) is either filleted or chamfered; and
the fourth end (352, 750) of the spool (348, 702) is either filleted or chamfered.

16. An aircraft comprising:
a fuselage (102);
a first hydraulic braking system (114), connected to the fuselage (102); and
a shuttle valve (200, 600), operably connected to the first hydraulic braking system (114), the shuttle valve (200, 600) comprising:
a first inlet (604);
a manifold chamber (608) in fluidic communication with the first inlet (604);
a second inlet (606) in fluidic communication with the manifold chamber (608);
an outlet (610) in fluidic communication with the manifold chamber (608); and
a spool-sleeve assembly (300), positioned inside the manifold chamber (608) and comprising:
a sleeve (302), comprising a first end (304, 704), a second end (306, 706), a first inner radius (310), a second inner radius (338), and a third inner radius (342);
a spool (348, 702), slidably located inside the sleeve (302) and comprising a third end (350, 748) and a fourth end (352, 750);
a first flange (312), integrally formed with the sleeve (302) and outwardly extending from the first end (304, 704) of the sleeve (302);
a second flange (324), integrally formed with the sleeve (302) and outwardly extending from the second end (306, 706) of the sleeve (302);
a first press fitting (336), located on a first inner wall (308) of the sleeve (302);
a second press fitting (340), located on the first inner wall (308) of the sleeve (302);
a first hole (344), located through the sleeve (302) between the first flange (312) and the second flange (324);
a first ridge (358, 752), outwardly extending from the spool (348, 702) proximate the third end (350, 748) of the spool (348, 702); and
a second ridge (364, 754), outwardly extending from the spool (348, 702) proximate the fourth end (352, 750) of the spool (348, 702),
wherein:
the first flange (312) is segmented into a first plurality of flange segments (707) via a first slit (318), located in the first flange (312);
the second flange (324) is segmented into a second plurality of flanges (717) via a second slit (330), located in the second flange (324);
the first press fitting (336) is inwardly located on the first inner wall (308) of the sleeve (302) proximate the first end (304, 704) and the first slit (318);
the second inner radius (338) of the sleeve (302) is at the first press fitting (336);
the second inner radius (338) of the sleeve (302) is smaller than the first inner radius (310) of the sleeve (302);
the second press fitting (340) is inwardly located on the first inner wall (308) of the sleeve proximate the second end (306, 706) and the second slit (330);
the third inner radius (342) of the sleeve (302) is at the second press fitting (340);
the third inner radius (342) of the sleeve (302) is smaller than the first inner radius (310);
the third end (350, 748) is sized and dimensioned to block the first inlet (604) and the fourth end (352, 750) is sized and dimensioned to block the second inlet (606);
the first ridge (358, 752) comprises a first outer diameter (360, 1200), which is greater than the second inner radius (338) of the sleeve (302), and a first groove (362, 760), located in the first ridge (358, 752);
the second ridge (364, 754) comprises a second outer diameter (366, 1202), which is greater than the third inner radius (342) of the sleeve (302), and a second groove (368, 762), located in the second ridge (364, 754);

the first press fitting (336) is sized and dimensioned so that at least a first portion of the first press fitting (336) fits in the first groove (362, 760); and the second press fitting (340) is sized and dimensioned so that at least a second portion of the second press fitting (340) fits in the second groove (368, 762).

17. The aircraft of claim 16, wherein:

the first plurality of flange segments (707) comprises at least a first flange segment (314) and a second flange segment (316), and the first flange segment (314) has a first flange outer radius (320) that is greater than a second flange outer radius of the second flange segment (316).

18. The aircraft of claim 17, wherein:

the second plurality of flanges (717) comprises at least a fifth flange (716) and a sixth flange (718), the fifth flange (716) has a fifth flange outer radius, which is greater than a sixth flange outer radius of the sixth flange (718), and the fifth flange outer radius is equal to the first flange outer radius (320).

19. The aircraft of claim 16, further comprising a first seal (372), located at the first end (304, 704) of the sleeve (302), the first seal (372) configured to receive the third end (350, 748) of the spool (348, 702), wherein:

the first seal (372) comprises a first orifice (374) that receives the third end (350, 748) of the spool (348, 702);

the first orifice (374) has a first radius (376) that is equal to a third outer diameter (354) of the third end (350, 748); and the first radius (376) of the first orifice (374) is smaller than the first outer diameter (360, 1200) of the first ridge (358, 752).

20. A shuttle valve (200, 600), comprising:

a first inlet (604);

a manifold chamber (608) in fluidic communication with the first inlet (604);

a second inlet (606) in fluidic communication with the manifold chamber (608);

an outlet (610) in fluidic communication with the manifold chamber (608); and a spool-sleeve assembly (300), positioned inside the manifold chamber (608) and comprising:

a sleeve (302), comprising a first end (304, 704), a second end (306, 706), a first inner radius (310), a second inner radius (338), and a third inner radius (342);

a spool (348, 702), slidably located inside the sleeve (302) and comprising a third end (350, 748) and a fourth end (352, 750);

a first flange (312), integrally formed with the sleeve (302) and outwardly extending from the first end (304, 704) of the sleeve (302);

a second flange (324), integrally formed with the sleeve (302) and outwardly extending from the second end (306, 706) of the sleeve (302);

a first press fitting (336), located on a first inner wall (308) of the sleeve (302);

a second press fitting (340), located on the first inner wall (308) of the sleeve (302);

a first hole (344), located through the sleeve (302) between the first flange (312) and the second flange (324);

a first ridge (358, 752), outwardly extending from the spool (348, 702) proximate the third end (350, 748) of the spool (348, 702); and a second ridge (364, 754), outwardly extending from the spool (348, 702) proximate the fourth end (352, 750) of the spool (348, 702), wherein:

the first flange (312) is segmented into a first plurality of flange segments (707) via a first slit (318), located in the first flange (312);

the second flange (324) is segmented into a second plurality of flanges (717) via a second slit (330), located in the second flange (324);

the first press fitting (336) is inwardly located on the first inner wall (308) of the sleeve (302) proximate the first end (304, 704) and the first slit (318);

the second inner radius (338) of the sleeve (302) is at the first press fitting (336);

the second inner radius (338) of the sleeve (302) is smaller than the first inner radius (310) of the sleeve (302);

the second press fitting (340) is inwardly located on the first inner wall (308) of the sleeve proximate the second end (306, 706) and the second slit (330);

the third inner radius (342) of the sleeve (302) is at the second press fitting (340);

the third inner radius (342) of the sleeve (302) is smaller than the first inner radius (310);

the third end (350, 748) is sized and dimensioned to block the first inlet (604) and the fourth end (352, 750) is sized and dimensioned to block the second inlet (606);

the first ridge (358, 752) comprises a first outer diameter (360, 1200), which is greater than the second inner radius (338) of the sleeve (302), and a first groove (362, 760), located in the first ridge (358, 752);

the second ridge (364, 754) comprises a second outer diameter (366, 1202), which is greater than the third inner radius (342) of the sleeve (302), and a second groove (368, 762), located in the second ridge (364, 754);

the first press fitting (336) is sized and dimensioned so that at least a first portion of the first press fitting (336) fits in the first groove (362, 760); and the second press fitting (340) is sized and dimensioned so that at least a second portion of the second press fitting (340) fits in the second groove (368, 762).

* * * * *